US012804160B2

(12) United States Patent
Andersson et al.

(10) Patent No.: US 12,804,160 B2

(45) Date of Patent: Nov. 17, 2026

(54) CHANGING QUANTIZATION PARAMETER VALUES BASED ON RESOLUTION CHANGE

(71) Applicant: Telefonaktiebolaget LM Ericsson (publ), Stockholm (SE)

(72) Inventors: Kenneth Andersson, Gävle (SE); Jacob Ström, Stockholm (SE); Per Wennersten, Årsta (SE); Waqas Ahmad, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/128,290

(22) PCT Filed: Nov. 10, 2023

(86) PCT No.: PCT/EP2023/081411

§ 371 (c)(1),
(2) Date: May 8, 2025

(87) PCT Pub. No.: WO2024/100242

PCT Pub. Date: May 16, 2024

(65) Prior Publication Data

US 2025/0343918 A1 Nov. 6, 2025

Related U.S. Application Data

(60) Provisional application No. 63/424,550, filed on Nov. 11, 2022.

(51) Int. Cl.
*H04N 19/00* (2014.01)
*H04N 19/14* (2014.01)
(Continued)

(52) U.S. Cl.
CPC .......... *H04N 19/14* (2014.11); *H04N 19/186* (2014.11); *H04N 19/70* (2014.11)

(58) Field of Classification Search
CPC ....................................................... H04N 19/00
See application file for complete search history.

(56) References Cited

U.S. PATENT DOCUMENTS 8,213,508 B2 7/2012 Boyce et al.
8,681,866 B1 3/2014 Jia
(Continued)

FOREIGN PATENT DOCUMENTS

WO 2020/141260 A1 7/2020
WO 2021/129867 A1 7/2021
(Continued)

OTHER PUBLICATIONS

International Search Report and Written Opinion issued in International Application No. PCT/EP2023/081411 dated Feb. 23, 2024 (17 pages).

(Continued)

*Primary Examiner* — Maryam A Nasri
(74) *Attorney, Agent, or Firm* — Rothwell, Figg, Ernst & Manbeck, P.C.

(57) ABSTRACT

A method for encoding or decoding a region of a picture included in a video stream is provided. The method comprises obtaining a first value of a luma quantization parameter (QP) for luma component, and based on the first value of the luma QP, determining a first value of a chroma QP for chroma component. The method further comprises obtaining a second value of the luma QP, and based on the second value of the luma QP, determining a second value of the chroma QP. The method further comprises encoding or decoding the region of the picture in a second resolution using the second value of the luma QP and the second value of the chroma QP.

24 Claims, 9 Drawing Sheets

(51) Int. Cl.
*H04N 19/186* (2014.01)
*H04N 19/70* (2014.01)

(56) References Cited

U.S. PATENT DOCUMENTS

| | | | | |
|---|---|---|---|---|
| 11,553,188 | B1 | 1/2023 | Shi et al. | |
| 2002/0061143 | A1 | 5/2002 | Konoshima | |
| 2010/0189183 | A1 | 7/2010 | Gu et al. | |
| 2014/0192868 | A1 | 7/2014 | Chen et al. | |
| 2016/0269733 | A1 | 9/2016 | Tourapis et al. | |
| 2016/0295216 | A1 | 10/2016 | Aaron et al. | |
| 2019/0373284 | A1 | 12/2019 | Mao | |
| 2020/0175341 | A1 | 6/2020 | Krishnamoorthy | |
| 2020/0213605 | A1 | 7/2020 | Wenger et al. | |
| 2020/0260085 | A1 | 8/2020 | Mao | |
| 2020/0404269 | A1 | 12/2020 | Choi et al. | |
| 2020/0404279 | A1 | 12/2020 | Choi et al. | |
| 2021/0044799 | A1 | 2/2021 | Luo et al. | |
| 2022/0060712 | A1 | 2/2022 | Zhang et al. | |
| 2022/0141475 | A1 | 5/2022 | Herrou et al. | |
| 2023/0128218 | A1* | 4/2023 | Deng .................. | H04N 19/186 375/240.26 |
| 2023/0275950 | A1 | 8/2023 | Sundareson et al. | |
| 2024/0406437 | A1 | 12/2024 | Nam et al. | |

FOREIGN PATENT DOCUMENTS

| | | | |
|---|---|---|---|
| WO | 2021/259223 | A1 | 12/2021 |
| WO | 2022115102 | A1 | 6/2022 |

OTHER PUBLICATIONS

Kotra et al., "AHG11: Neural Network-based Super Resolution", Joint Video Experts Team (JVET) of ITU-T SG 16 WP 3 and ISO/IEC JTC 1/SC 29, Document: JVET-U0099-v2, 21st Meeting, by teleconference, Jan. 6-15, 2021 (6 pages).

Norkin, "HDR color conversion with varying distortion metrics", Proceedings of SPIE, vol. 9971, Sep. 27, 2016, pp. 99710E-99710E, XP060078023 (11 pages).

Sullivan et al., "Meeting Report of the 23rd Meeting of the Joint Video Experts Team (JVET), by teleconference, Jul. 7-16, 2021", Joint Video Experts Team (JVET) of ITU-T SG 16 WP 3 and ISO/IEC JTC 1/SC 29, Document: JVET-W1000, 23rd Meeting, by teleconference, Jul. 7-16, 2021 (190 pages).

Strom et al., "Luma Adjustment for High Dynamic Range Video", 2016 Data Compression Conference (DCC), 2016, pp. 319-328, IEEE (10 pages).

Chen et al., "Algorithm description for Versatile Video Coding and Test Model 12 (VTM 12)", Joint Video Experts Team (JVET) of ITU-T SG 16 WP 3 and ISO/IEC JTC 1/SC 29, Document: JVET-U2002-v1, 21st Meeting, by teleconference, Jan. 6-15, 2021, (103 pages).

Strom et al., "High quality HDR video compression using HEVC main 10 profile", 2016 Picture Coding Symposium (PCS), IEEE, Dec. 4, 2016, p. 1-5, XP033086882 (5 pages).

Andersson et al., "AHG10: GOP-based RPR encoder control", Joint Video Experts Team (JVET) of ITU-T SG 16 WP 3 and ISO/IEC JTC 1/SC 29, Document: JVET-W0082, 23rd Meeting, by teleconference, Jul. 7-16, 2021 (5 pages).

Li et al., "On chroma QP mapping", Joint Video Experts Team (JVET) of ITU-T SG 16 WP 3 and ISO/IEC JTC 1/SC 29/WG 11, Document: JVET-S0130-v3, 19th Meeting: by teleconference, Jun. 22-Jul. 1, 2020 (6 pages).

Ikai et al., "Low bitrate UHD coding for Future Video Coding", International Organisation for Standardisation, Organisation Internationale De Normalisation, ISO/IEC JTC1/SC29/WG11, Coding of Moving Pictures and Audio, ISO/IEC JTC1/SC29/WG11, MPEG2015/m36440 (rl), Jun. 2015, Warsaw, Poland (8 pages).

Wang et al., "AHG15: Signalling of CU level chroma QP offset", Joint Video Experts Team (JVET) of ITU-T SG 16 WP 3 and ISO/IEC JTC 1/SC 29/WG 11, Document: JVET-P0339-v4, 16th Meeting: Geneva, CH, Oct. 1-11, 2019 (8 pages).

International Search Report and Written Opinion issued in International Application No. PCT/EP2022/068062 dated Nov. 9, 2022 (18 pages).

Non-Final Office Action issued in U.S. Appl. No. 18/573,838 on Aug. 26, 2025 (27 pages).

Office Action dated Mar. 24, 2026 issued in U.S. Appl. No. 18/573,838.

* cited by examiner

CHANGING QUANTIZATION PARAMETER VALUES BASED ON RESOLUTION CHANGE

CROSS REFERENCE TO RELATED APPLICATIONS

This application is a 35 U.S.C. § 371 National Stage of International Patent Application No. PCT/EP2023/081411, filed 2023 Nov. 10, which claims priority to U.S. Provisional Patent Application No. 63/424,550, filed on 2022 Nov. 11. The above-identified applications are incorporated by this reference.

TECHNICAL FIELD

Disclosed are embodiments related to changing quantization parameter (QP) values based on resolution change.

BACKGROUND

Video, Picture, and Picture Resolution

A video sequence consists of a series of pictures. Each picture consists of one or more components. Each component can be described as a two-dimensional rectangular array of sample values. It is common that a picture consists of three components: one luma component Y where the sample values are luma values, and two chroma components Cb and Cr where the sample values are chroma values.

The resolution of a picture usually refers to the size of the luma component of the picture. For example, a picture with resolution of 1920×1080 means the width of the luma component of the picture is 1920, and the height of the luma component of the picture is 1080.

Parameter Sets, Slice Headers, and Picture Headers

Versatile Video Coding (VVC) specifies three types of parameter sets: the picture parameter set (PPS), the sequence parameter set (SPS), and the video parameter set (VPS). The PPS contains data that is common for a whole picture, the SPS contains data that is common for a coded layer video sequence (CLVS), and the VPS contains data that is common for multiple CLVSs, e.g., data for multiple layers in the bitstream.

The concept of slices is dividing the picture into independently coded slices, where decoding of one slice in a picture is independent of other slices of the same picture. Each slice has a slice header comprising syntax elements. Decoded slice header values from these syntax elements are used when decoding the slice.

In VVC, a coded picture contains a picture header. The picture header contains parameters that are common for all slices of the coded picture.

Coding Unit and Coding Block

A block is one two-dimensional array of samples. In video coding, each component is split into blocks and the coded video bitstream consists of a series of coded blocks. It is common in video coding that pictures are split into units that cover a specific area of the picture.

Each unit consists of all blocks from all components that make up that specific area and each block belongs fully to one unit. The Coding unit (CU) in VVC is an example of units. In VVC the CUs may be split recursively to smaller CUs. The CU at the top level is referred to as the coding tree unit (CTU). A CU usually contains three coding blocks, i.e., one coding block for luma and two coding blocks for chroma. The size of luma coding block is the same as the CU. In the current VVC (i.e.m version 1), the CUs can have size of 4×4 up to 128×128.

Intra Prediction

In intra prediction, also known as spatial prediction, a block is predicted using the previous decoded blocks within the same picture. The samples from the previously decoded blocks within the same picture are used to predict the samples inside the current block. A picture consisting of only intra-predicted blocks is referred to as an intra picture.

Inter Prediction and Motion Compensation

In inter prediction, also known as temporal prediction, blocks of the current picture are predicted using blocks from previously decoded pictures. The samples from blocks in the previously decoded pictures are used to predict the samples inside the current block. A picture that allows inter-predicted block is referred to as an inter picture. The previous decoded pictures used for inter prediction are referred to as reference pictures.

Residual, Transform, and Quantization

The difference between samples of a source block (contains original samples) and samples of the prediction block, also called residual block, is then typically compressed by a spatial transform to remove further redundancy. The transform coefficients are then quantized by a quantization parameter (QP) to control the fidelity of the residual block and thus also the bitrate required to compress the block. A coded block flag (CBF) is used to indicate if there are any non-zero quantized transform coefficients. All coding parameters are then entropy coded at the encoder and decoded at the decoder. A reconstructed block can then be derived by inverse quantization and inverse transformation of the quantized transform coefficients if the coded block flag is one and then add that to the prediction block.

Picture Downscaling and Upscaling

In video coding, a current picture with a current resolution can be rescaled to a different target resolution. A rescaling filter is usually involved in the rescaling process.

When the target resolution is smaller than the current resolution, the rescaling operation is often referred to as downscaling operation. The rescaling filters used in the downscaling operation are usually low-pass filters to reduce the risk of introducing aliasing artifacts in the downscaled picture. High frequency details that exist in the source resolution are sometimes lost during the downscaling process.

When the target resolution is greater than the current resolution, the rescaling operation is referred to as upscaling. If the current picture has been downscaled before from another original picture at a higher resolution, the upscaling process is typically not able to fully recover or reproduce the high frequency that exists in the original picture.

Adaptive Video Streaming

In adaptive streaming, a video sequence is typically divided into segments that are each 1-5 seconds long. These segments are encoded at a variety of resolution and qualities so that several segments are covering every given time interval. All segments and are then typically stored on the server side. When the decoder wants to display video corresponding to a certain time interval, it can choose one of many segments varying in bit rate and quality. The decoder typically determines which segment to request based on preferences or transmission capabilities resolution. This means that video quality can increase and decrease during playback as a function of network throughput; when network throughput is high, the decoder selects high bit rate segments giving high quality and/or high resolution, and when network throughput is lower, resolution, quality and bit rate goes down while still providing a smooth playback experience without stopping to buffer.

In the case of pre-recorded content, the encoding for adaptive streaming can be performed once and the segments can then be stored on the server to serve many decoder playback requests. In this case, the encoding does not have to be real-time. Some adaptive streaming systems allow for live content. In this case, the encoder has to be able to encode faster than realtime, since several segments must be produced for the same time interval. Just as in the case with pre-recorded content, these segments are then stored on the server and several viewers (clients) can then request these segments and decode them. Some of these clients may be having poor network throughput, and will be requestion low bit rate segments for a certain time interval, whereas other clients may be enjoying high network throughput and will request a high bit rate segment for the same time interval.

In video conferencing, especially when only two users are communicating point to point (rather than multipoint), the resolution or the quality can be adjusted to adapt to the current transmission channel throughput. In contrast to adaptive streaming, it is then not necessary to create several segments for the same time interval, and the encoding therefore does not need to happen faster than real time: if the bit rate is too high, the decoder can signal that to the encoder which can then lower the quality or resolution of subsequent frames, resulting in a lower bit rate for those future frames.

VVC, and Reference Picture Resampling (RPR)

Versatile Video Coding (VVC) is a block-based video codec standardized by International Telecommunication Union-Telecommunication (ITU-T) and Motion Picture Experts Group (MPEG) that utilizes both temporal and spatial prediction. Spatial prediction is achieved using intra (I) prediction from within a current picture. Temporal prediction is achieved using uni-directional (P) or bi-directional inter (B) prediction on a block level from previously decoded reference pictures. In the encoder, the difference between the original sample data and the predicted sample data, referred to as the residual, is transformed into the frequency domain, quantized, and then entropy coded before being transmitted together with necessary prediction parameters such as prediction mode and motion vectors, which are also entropy coded. The decoder performs entropy decoding, inverse quantization, and inverse transformation to obtain the residual and then adds the residual to an intra or inter prediction to reconstruct a picture.

RPR is a VVC tool that can be used to enable switching between different resolutions in a video bitstream without encoding a startup of a new sequence with an intra picture. This gives more flexibility to adapt resolution to control bitrate which can be of used in for example video conferencing or adaptive streaming. RPR can make use of previously encoded pictures of lower or higher resolution than the current picture to be encoded by rescaling them to the resolution of the current picture as part of inter prediction of the current picture.

Hierarchical B Picture Coding Structure

In what is often referred to as the 'random access configuration', intra coded pictures are positioned with a fixed interval like every second. Pictures between the intra picture are typically coded with a hierarchical B picture structure.

One example of hierarchy of 8 pictures is shown in FIG. 9 below. Picture 0 is coded first and then picture 8 is coded using picture 0 as its reference picture. Then picture 8 and picture 0 are used as reference pictures to code picture 4. Then similarly, picture 2 and picture 6 are coded. And finally, picture 1, 3, 5 and 7 pictures are coded. We refer to pictures 1, 3, 5 and 7 to be on the highest hierarchical level, pictures 2, 4 and 6 to be on the next highest hierarchical level, and picture 4 to be on next lowest level and picture 8 to be on the lowest level. Typically picture 1, 3, 5 and 7 are not used for reference of any other pictures. They are called non-reference pictures. In video coding, a hierarchy of 16 or 32 pictures are also commonly used.

QP Control in VVC

In the Sequence Parameter Set (SPS) a luma to chroma QP mapping table is signaled and its then defining a ChromaQpTable which have corresponding chroma QP for a given luma QP.

From SPS

```
if( sps_chroma_format_idc != 0 ) {
  sps_joint_cbcr_enabled_flag                                   u(1)
  sps_same_qp_table_for_chroma_flag                             u(1)
  numQpTables = sps_same_qp_table_for_chroma_flag ? 1 :
      ( sps_joint_cbcr_enabled_flag ? 3 : 2 )
  for( i = 0; i < numQpTables; i++ ) {
    sps_qp_table_start_minus26[ i ]                             se(v)
    sps_num_points_in_qp_table_minus1[ i ]                      ue(v)
    for( j = 0; j <= sps_num_points_in_qp_table_
    minus1[i ]; j++ ) {
      sps_delta_qp_in_val_minus1[ i ][ j ]                      ue(v)
      sps_delta_qp_diff_val[ i ][ j ]                           ue(v)
    }
  }
```

sps_joint_cbcr_enabled_flag equal to 1 specifies that the joint coding of chroma residuals is enabled for the CLVS. sps_joint_cbcr_enabled_flag equal to 0 specifies that the joint coding of chroma residuals is disabled for the CLVS. When not present, the value of sps_joint_cbcr_enabled_flag is inferred to be equal to 0.

sps_same_qp_table_for_chroma_flag equal to 1 specifies that only one chroma QP mapping table is signalled and this table applies to Cb and Cr residuals and additionally to joint Cb-Cr residuals when sps_joint_cbcr_enabled_flag is equal to 1.

sps_same_qp_table_for_chroma_flag equal to 0 specifies that chroma QP mapping tables, two for Cb and Cr, and one additional for joint Cb-Cr when sps_joint_cbcr_enabled_flag is equal to 1, are signalled in the SPS. When not present, the value of sps_same_qp_table_for_chroma_flag is inferred to be equal to 1.

sps_qp_table_start_minus26[i] plus 26 specifies the starting luma and chroma QP used to describe the i-th chroma QP mapping table. The value of sps_qp_table_start_minus26[i] shall be in the range of −26-QpBdOffset to 36 inclusive. When not present, the value of sps_qp_table_start_minus26[i] is inferred to be equal to 0.

sps_num_points_in_qp_table_minus1[i] plus 1 specifies the number of points used to describe the i-th chroma QP mapping table. The value of sps_num_points_in_qp_table_minus1[i] shall be in the of 0 range to 36-sps_qp_table_start_minus26[i], inclusive. When not present, the value of sps_num_points_in_qp_table_minus1[0] is inferred to be equal to 0.

sps_delta_qp_in_val_minus1[i][j] specifies a delta value used to derive the input coordinate of the j-th pivot point of the i-th chroma QP mapping table. When not present, the value of sps_delta_qp_in_val_minus1[0][j] is inferred to be equal to 0.

sps_delta_qp_diff_val[i][j] specifies a delta value used to derive the output coordinate of the j-th pivot point of the i-th chroma QP mapping table.

The i-th chroma QP mapping table ChromaQpTable[i] for i=0 . . . numQpTables—1 is derived as follows:

```
qpInVal[ i ][ 0 ] = sps_qp_table_start_minus26[ i ] + 26
qpOutVal[ i ][ 0 ] = qpInVal[ i ][ 0 ]
for( j = 0; j <= sps_num_points_in_qp_table_minus1[ i ]; j++ ) {
  qpInVal[ i ][ j + 1 ] = qpInVal[ i ][ j ] + sps_delta_qp_in_val_minus1[ i ][ j ] + 1
  qpOutVal[ i ][ j + 1 ] = qpOutVal[ i ][ j ] +
    ( sps_delta_qp_in_val_minus1[ i ][ j ] ^ sps_delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] − 1; k >= −QpBdOffset; k — )
  ChromaQpTable[ i ][ k ] = Clip3( −QpBdOffset, 63, ChromaQpTable[ i ][ k + 1 ] − 1 )
  (1)
for( j = 0; j <= sps_num_points_in_qp_table_minus1[ i ]; j++ ) {
  sh = ( sps_delta_qp_in_val_minus1[ i ][ j ] + 1 ) >> 1
  for( k = qpInVal[ i ][ j ] + 1, m = 1; k <= qpInVal[ i ][ j + 1 ]; k++, m++ )
    ChromaQpTable[ i ][ k ] = ChromaQpTable[ i ][ qpInVal[ i ][ j ] ] +
      ( ( qpOutVal[ i ][ j + 1 ] − qpOutVal[ i ][ j ] ) * m + sh ) /
( sps_delta_qp_in_val_minus1[ i ][ j ] + 1 )
}
for( k = qpInVal[ i ][ sps_num_points_in_qp_table_minus1[ i ] + 1 ] + 1; k <= 63; k++ )
  ChromaQpTable[ i ][ k ] = Clip3( −QpBdOffset, 63, ChromaQpTable[ i ][ k − 1 ] + 1 )
```

When sps_same_qp_table_for_chroma_flag is equal to 1, ChromaQpTable[1][k] and ChromaQpTable[2][k] are set equal to ChromaQpTable[0][k] for k in the range of −QpBdOffset to 63, inclusive.

An initial QP can be signalled in the Picture Parameter Set (PPS) together with one or several QP offsets for chroma components which then can be refined in the slice and or picture header.

From PPS:

| | |
|---|---|
| pps_init_qp_minus26 | se(v) |
| pps_cu_qp_delta_enabled_flag | u(1) |
| pps_chroma_tool_offsets_present_flag | u(1) |
| if( pps_chroma_tool_offsets_present_flag ) { | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
|   if( pps_cu_chroma_qp_offset_list_enabled_flag ) { | |
|     pps_chroma_qp_offset_list_len_minus1 | ue(v) |
|     for( i = 0; i <= pps_chroma_qp_offset_list_len_minus1; i++ ) { | |
|       pps_cb_qp_offset_list[ i ] | se(v) |
|       pps_cr_qp_offset_list[ i ] | se(v) |
|       if( pps_joint_cbcr_qp_offset_present_flag ) | |
|         pps_joint_cbcr_qp_offset_list[ i ] | se(v) |
|     } | |
|   } | |

pps_init_qp_minus26 plus 26 specifies the initial value of $SliceQp_Y$ for each slice referring to the PPS. The initial value of $SliceQp_Y$ is modified at the picture level when a non-zero value of ph_qp_delta is decoded or at the slice level when a non-zero value of sh_qp_delta is decoded. The value of pps_init_qp_minus26 shall be in the range of −(26+QpBdOffset) to +37, inclusive.

From Picture Header

| | |
|---|---|
| if( pps_qp_delta_info_in_ph_flag ) | |
|   ph_qp_delta | se(v) |
| if( sps_joint_cbcr_enabled_flag ) | |
|   ph_joint_cbcr_sign_flag | u(1) |

ph_qp_delta specifies the initial value of $Qp_Y$ to be used for the coding blocks in the picture until modified by the value of CuQpDeltaVal in the coding unit layer.

When pps_qp_delta_info_in_ph_flag is equal to 1, the initial value of the $Qp_Y$ quantization parameter for all slices of the picture, $SliceQp_Y$, is derived as follows:

$$SliceQp_Y = 26 + \text{pps\_init\_qp\_minus26} + \text{ph\_qp\_delta} \quad (2)$$

The value of $SliceQp_Y$ shall be in the range of −QpBdOffset to +63, inclusive.

From Slice Header

| | |
|---|---|
| if( !pps_qp_delta_info_in_ph_flag ) | |
|   sh_qp_delta | se(v) |
| if( pps_slice_chroma_qp_offsets_present_flag ) { | |
|   sh_cb_qp_offset | se(v) |
|   sh_cr_qp_offset | se(v) |
|   if( sps_joint_cbcr_enabled_flag ) | |
|     sh_joint_cbcr_qp_offset | se(v) |
| } | |
| if( pps_cu_chroma_qp_offset_list_enabled_flag ) | |
|   sh_cu_chroma_qp_offset_enabled_flag | u(1) |

sh_qp_delta specifies the initial value of $Qp_Y$ to be used for the coding blocks in the slice until modified by the value of CuQpDeltaVal in the coding unit layer.

When pps_qp_delta_info_in_ph flag is equal to 0, the initial value of the $Qp_Y$ quantization parameter for the slice, $SliceQp_Y$, is derived as follows:

$$SliceQp_Y = 26 + \text{pps\_init\_qp\_minus26} + \text{sh\_qp\_delta} \quad (3)$$

The value of $SliceQp_Y$ shall be in the range of −QpBdOffset to +63, inclusive.

From Transform unit syntax

| | |
|---|---|
| if( ( CbWidth[ chType ][ x0 ][ y0 ] > 64 \| \| CbHeight[ chType ][ x0 ][ y0 ] > 64 \| \| | |
| ( chromaAvailable && ( tu_cb_coded_flag[ xC ][ yC ] \| \| | |
| tu_cr_coded_flag[ xC ][ yC ] ) ) ) && | |
| treeType != DUAL_TREE_LUMA && sh_cu_chroma_qp_offset_enabled_flag && | |
| !IsCuChromaQpOffsetCoded ) { | |
| cu_chroma_qp_offset_flag | ae(v) |
| if( cu_chroma_qp_offset_flag && pps_chroma_qp_offset_list_len_minus1 > 0 ) | |
| cu_chroma_qp_offset_idx | ae(v) |

The luma QP ($Qp_Y$) is firstly derived from the slice QP then it is predicted from luma QP of neighboring blocks. The variable $Qp_Y$ is derived as follows:

$$Qp_Y = ((qP_{Y\_PRED} + CuQpDeltaVal + 64 + 2 * QpBdOffset) \% (64 + QpBdOffset)) - QpBdOffset \quad (4)$$

where the variable $qP_{Y\_PREV}$ is derived as follows:

If one or more of the following conditions are true, $qP_{Y\_PREV}$ is set equal to $SliceQp_Y$:

The current quantization group is the first quantization group in a slice.

The current quantization group is the first quantization group in a tile.

Otherwise, $qP_{Y\_PREV}$ is set equal to the luma quantization parameter $Qp_Y$ of the last luma coding unit in the previous quantization group in decoding order.

The luma quantization parameter $Qp'_Y$ is derived as follows:

$$Qp'_Y = Qp_Y + QpBdOffset \quad (5)$$

The chroma QP is derived as:

The variables $qP_{Cb}$, $qP_{Cr}$ and $qP_{CbCr}$ are derived as follows:

$$qP_{Chroma} = Clip3(-QpBdOffset, 63, Qp_Y) \quad (6)$$

$$qP_{Cb} = ChromaQpTable[0][qP_{Chroma}] \quad (7)$$

$$qP_{Cr} = ChromaQpTable[1][qP_{Chroma}] \quad (8)$$

$$qP_{CbCr} = ChromaQpTable[2][qP_{Chroma}] \quad (9)$$

The chroma quantization parameters for the Cb and Cr components, $Qp'_{Cb}$ and $Qp'_{Cr}$, and joint Cb-Cr coding $Qp'_{CbCr}$ are derived as follows:

$$Qp'_{Cb} = Clip3(-QpBdOffset, 63, qP_{Cb} + \text{pps\_cb\_qp\_offset} + \text{sh\_cb\_qp\_offset} + CuQpOffset_{Cb}) + QpBdOffset \quad (10)$$

$$Qp'_{Cr} = Clip3(-QpBdOffset, 63, qP_{Cr} + \text{pps\_cr\_qp\_offset} + \text{sh\_cr\_qp\_offset} + CuQpOffset_{Cr}) + QpBdOffset \quad (11)$$

-continued $$Qp'_{CbCr} = Clip3(-QpBdOffset, 63, qP_{CbCr} + \text{pps\_joint\_cbcr\_offset\_value} + \text{sh\_joint\_cbcr\_qp\_offset} + CuQpOffset_{CbCr}) + QpBdOffset \quad (12)$$

So it can be seen that first the luma QP ($Qp_Y$) is used to derive a chroma QP via the ChromaQpTable. Then this chroma Cb QP can be adjusted by pps_cb_qp_offset+sh_cb_qp_offset+CuQpOffsetCb to get the final chroma QP for the chroma component Cb and the chroma Cr QP can be adjusted by pps_cr_qp_offset+sh_cr_qp_offset+CuQpOffsetCr to get the final chroma QP for the chroma component Cr.

The variables $CuQpOffset_{Cb}$, $CuQpOffset_{Cr}$, and $CuQpOffset_{CbCr}$ are derived as follows:

$$\text{If cu\_chroma\_qp\_offset\_flag is equal to 1, the following applies: } CuQpOffset_{Cb} = \text{pps\_cb\_qp\_offset\_list[cu\_chroma\_qp\_offset\_idx]} \quad (13)$$

$$CuQpOffset_{Cr} = \text{pps\_cb\_qp\_offset\_list[cu\_chroma\_qp\_offset\_idx]} \quad (14)$$

$$CuQpOffset_{CbCr} = \text{pps\_joint\_cbcr\_qp\_offset\_list[cu\_chroma\_qp\_offset\_idx]} \quad (15)$$

Otherwise (cu_chroma_qp_offset_flag is equal to 0), $CuQpOffset_{Cb}$, $CuQpOffset_{Cr}$, and $CuQpOffset_{CbCr}$ are all set equal to 0.

pps_cb_qp_offset and pps_cr_qp_offset are chroma QP offsets that can be defined in PPS and, sh_cb_qp_offset and sh_cr_qp_offset are chroma QP offsets than can be defined in slice header and, CuQpOffsetCb and CuQpOffsetCr are chroma QP offsets that can be defined on a block basis. A joint chroma QP offset can also be in addition to the component wise chroma QP offset control.

GOP Based RPR Control of Encoding Resolution

In GOP based control of encoding resolution the reduced resolution is encoded with finer quantization level to allow for similar amounts of bits as when encoding at full resolution. For quarter resolution (0.5 in both dimensions) the QP is reduce by −6 (since this corresponds to a halving of the quantization step size). For encoding is 4/9 resolution (2/3 in both dimensions) the QP is reduced by −4 and when encoding in 8/10 resolution (4/5 in both dimensions) the QP is reduced by −2.

Scalable Encoding

VVC and HEVC also supports coding different resolutions with dependency such that encodings of a lower resolution can used for prediction of a higher resolution and then encoding of the higher resolution. In scalable coding it has been shown that by encoding with a lower QP (finer quantization) in a base layer with quarter resolution than in enhancement layer of full resolution benefits from scalable coding over single layer coding could be achieved in some cases. The QP difference is similar to that of GOP based RPR control when encoding in quarter resolution e.g., around −6, e.g., lower QP in the base layer than in the enhancement layer for 2× scalability.

SUMMARY

Certain challenges presently exist. For example, in VVC, a luma QP to chroma QP mapping table is used to retrieve value(s) of chroma QP(s) based on a value of a luma QP. However, in the mapping table, a value of a chroma QP mapped to a value of a luma QP is different from the value of the luma QP. For example, in case a value of the luma QP is equal to 30, a value of the chroma QP corresponding to the value of the luma QP may be equal to 32, not 30. This is problematic, especially, when a resolution of a picture to be encoded and/or decoded is changed from one resolution to another resolution. For example, if a resolution of a picture to be encoded and/or decoded is changed from one resolution to another resolution, the value of the luma QP and the value of the chroma QP need to be changed by a desired amount in accordance with the resolution change to maintain similar relative amount of bits spent on luma and chroma when encoding in another resolution. But since the new value of the chroma QP (associated with the new resolution) is determined based on the new value of the luma QP (associated with the new resolution), the new value of the chroma QP may be different from changing the old value of the chroma QP by the desired amount (meaning that the new value of the chroma QP≠the old value of the chroma QP and the desired amount).

Accordingly, in one aspect of the embodiments of this disclosure, there is provided a method for encoding or decoding a region of a picture included in a video stream, where the region of the picture can be encoded in any of a first resolution and/or a second resolution. The method comprises obtaining a first value of a luma quantization parameter, QP, for luma component, wherein the first value of the luma QP is associated with the first resolution. The method further comprises, based on the first value of the luma QP, determining a first value of a chroma QP for chroma component, wherein the first value of the chroma QP is associated with the first resolution. The method further comprises obtaining a second value of the luma QP, wherein the second value of the luma QP is associated with the second resolution. The method further comprises, based on the second value of the luma QP, determining a second value of the chroma QP, wherein the second value of the chroma QP is associated with the second resolution. The method further comprises encoding or decoding the region of the picture in the second resolution using the second value of the luma QP and the second value of the chroma QP, wherein a difference between the first value of the luma QP and the second value of the luma QP is same as a difference between the first value of the chroma QP and the second value of the chroma QP.

In another aspect, there is provided a method for encoding or decoding a region of a picture included in a video stream, where the region of the picture can be encoded in any of a first resolution and/or a second resolution. The method comprises obtaining a first value of a luma quantization parameter, QP, for luma component, wherein the first value of the luma QP is associated with the first resolution; based on the first value of the luma QP, determining a first value of a chroma QP for chroma component, wherein the first value of the chroma QP is associated with the first resolution; and obtaining a configured luma QP changing value for the luma QP associated with a change from the first resolution to the second resolution. The method further comprises, based on the first value of the luma QP and the configured luma QP changing value, determining a second value of the luma QP, wherein the second value of the luma QP is associated with the second resolution. The method further comprises obtaining a configured chroma QP changing value for the chroma QP associated with a change from the first resolution to the second resolution, wherein the configured chroma QP changing value is different from the configured luma QP changing value. The method further comprises, based on the second value of the luma QP and/or the configured chroma QP changing value, determining a second value of the chroma QP, wherein the second value of the chroma QP is associated with the second resolution. The method further comprises encoding or decoding the region of the picture in the second resolution using the second value of the luma QP and the second value of the chroma QP, wherein a difference between the first value of the luma QP and the second value of the luma QP is same as the configured luma QP changing value, and a difference between the first value of the chroma QP and the second value of the chroma QP is same as the configured chroma QP changing value.

In another aspect, there is provided a method for encoding or decoding a region of a picture included in a video stream, where the region of the picture can be encoded in any of a first resolution and/or a second resolution. The method comprises obtaining a first value of a luma quantization parameter, QP, for luma component, wherein the first value of the luma QP is associated with the first resolution. The method comprises obtaining a first value of a chroma QP for chroma component, wherein the first value of the chroma QP is associated with the first resolution. The method comprises determining to encode a video in the second resolution; and based on the determination, retrieving a configured luma QP changing value associated with a change from the first resolution to the second resolution and a configured chroma QP changing value associated with a change from the first resolution to the second resolution. The method further comprises generating a second value of the luma QP based on the first value of the luma QP and the configured luma QP changing value; generating a second value of the chroma QP based on the first value of the chroma QP and the configure chroma QP changing value; and encoding or decoding the region of the picture in the second resolution using the second value of the luma QP and the second value of the chroma QP.

In another aspect, there is provided a computer program comprising instructions which when executed by processing circuitry cause the processing circuitry to perform the method of any one of the embodiments described above.

In another aspect, there is provided a carrier containing the computer program of the above embodiments, wherein the carrier is one of an electronic signal, an optical signal, a radio signal, and a computer readable storage medium.

In another aspect, there is provided an apparatus for encoding or decoding a region of a picture included in a video stream, where the region of the picture can be encoded in any of a first resolution and/or a second resolution. The apparatus is configured to obtain a first value of a luma quantization parameter, QP, for luma component, wherein the first value of the luma QP is associated with the first resolution. The apparatus is further configured to, based on the first value of the luma QP, determine a first value of a chroma QP for chroma component, wherein the first value of the chroma QP is associated with the first resolution; obtain a second value of the luma QP, wherein the second value of the luma QP is associated with the second resolution; and based on the second value of the luma QP, determine a second value of the chroma QP, wherein the second value of the chroma QP is associated with the second resolution. The apparatus is further configured to encode or decode the region of the picture in the second resolution using the second value of the luma QP and the second value of the chroma QP, wherein a difference between the first value of the luma QP and the second value of the luma QP is same as a difference between the first value of the chroma QP and the second value of the chroma QP.

In another aspect, there is provided an apparatus for encoding or decoding a region of a picture included in a video stream, where the region of the picture can be encoded in any of a first resolution and/or a second resolution. The apparatus is configured to obtain a first value of a luma quantization parameter, QP, for luma component, wherein the first value of the luma QP is associated with the first resolution. The apparatus is configured to, based on the first value of the luma QP, determine a first value of a chroma QP for chroma component, wherein the first value of the chroma QP is associated with the first resolution. The apparatus is configured to, obtain a configured luma QP changing value for the luma QP associated with a change from the first resolution to the second resolution; based on the first value of the luma QP and the configured luma QP changing value, determine a second value of the luma QP, wherein the second value of the luma QP is associated with the second resolution; and obtain a configured chroma QP changing value for the chroma QP associated with a change from the first resolution to the second resolution, wherein the configured chroma QP changing value is different from the configured luma QP changing value. The apparatus is configured to, based on the second value of the luma QP and/or the configured chroma QP changing value, determine a second value of the chroma QP, wherein the second value of the chroma QP is associated with the second resolution; and encode or decode the region of the picture in the second resolution using the second value of the luma QP and the second value of the chroma QP, wherein a difference between the first value of the luma QP and the second value of the luma QP is same as the configured luma QP changing value, and a difference between the first value of the chroma QP and the second value of the chroma QP is same as the configured chroma QP changing value.

In another aspect, there is provided an apparatus for encoding or decoding a region of a picture included in a video stream, where the region of the picture can be encoded in any of a first resolution and/or a second resolution. The apparatus is configured to obtain a first value of a luma quantization parameter, QP, for luma component, wherein the first value of the luma QP is associated with the first resolution; obtain a first value of a chroma QP for chroma component, wherein the first value of the chroma QP is associated with the first resolution; and determine to encode a video in the second resolution. The apparatus is further configured to, based on the determination, retrieve a configured luma QP changing value associated with a change from the first resolution to the second resolution and a configured chroma QP changing value associated with a change from the first resolution to the second resolution; generate a second value of the luma QP based on the first value of the luma QP and the configured luma QP changing value; generate a second value of the chroma QP based on the first value of the chroma QP and the configure chroma QP changing value; and encode or decode the region of the picture in the second resolution using the second value of the luma QP and the second value of the chroma QP.

In another aspect, there is provided an apparatus comprising: a processing circuitry and a memory, said memory containing instructions executable by said processing circuitry, whereby the apparatus is operative to perform the method of any one of the embodiments described above.

Embodiments of this disclosure allow generating correct/desired value for QP for chroma components, thereby improving the performance of video encoding and decoding.

The accompanying drawings, which are incorporated herein and form part of the specification, illustrate various embodiments.

BRIEF DESCRIPTION OF THE DRAWINGS

The accompanying drawings, which are incorporated herein and form part of the specification, illustrate various embodiments.

DETAILED DESCRIPTION

Figure 1A:
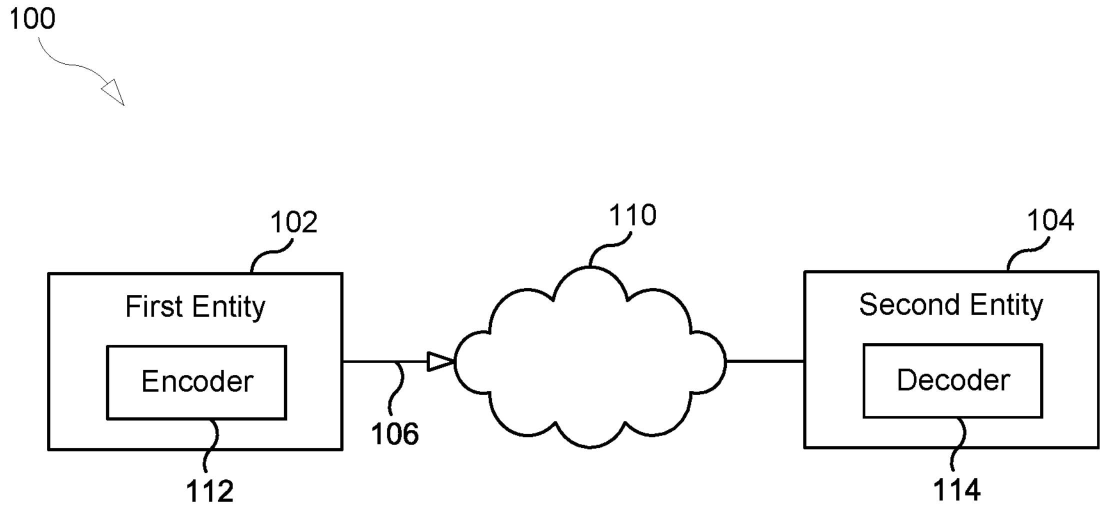
FIG. 1A shows a system according to some embodiments.

FIG. 1A shows a system 100 according to some embodiments. System 100 comprises a first entity 102, a second entity 104, and a network 110. First entity 102 is configured to transmit towards second entity 104 a video stream (a.k.a., "a video bitstream," "a bitstream," "an encoded video") 106.

First entity 102 may be any computing device (e.g., a network node such as a server) capable of encoding a video using an encoder 112 and transmitting the encoded video towards second entity 104 via network 110. Second entity 104 may be any computing device (e.g., a network node, a user equipment such as a mobile phone, a laptop, a tablet, a vehicle, etc.) capable of receiving the encoded video and decoding the encoded video using a decoder 114. Each of first entity 102 and second entity 104 may be a single physical entity or a combination of multiple physical entities. The multiple physical entities may be located in the same location or may be distributed in a cloud.

Figure 1B:
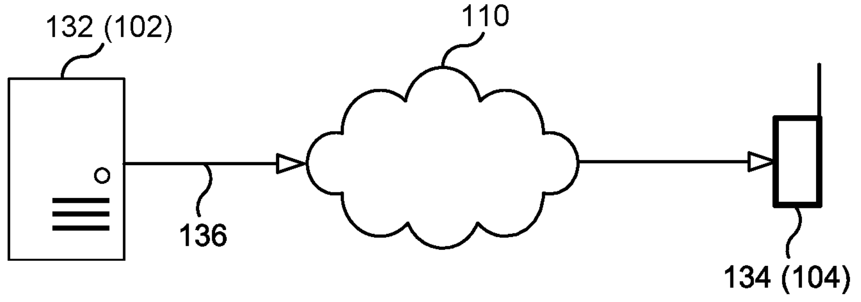
FIG. 1B shows a system according to some embodiments.

In some embodiments, as shown in FIG. 1B, first entity 102 is a video streaming server 132 and second entity 104 is a video streaming client—e.g., a user equipment (UE) 134. UE 134 may be any of a desktop, a laptop, a tablet, a mobile phone, or any other computing device. Video streaming server 132 is capable of transmitting a video bitstream 136 (e.g., YouTube™ video streaming) towards video streaming client 134. Upon receiving video bitstream 136, UE 134 may decode received video bitstream 136, thereby generating and displaying a video for the video streaming.

Figure 1C:
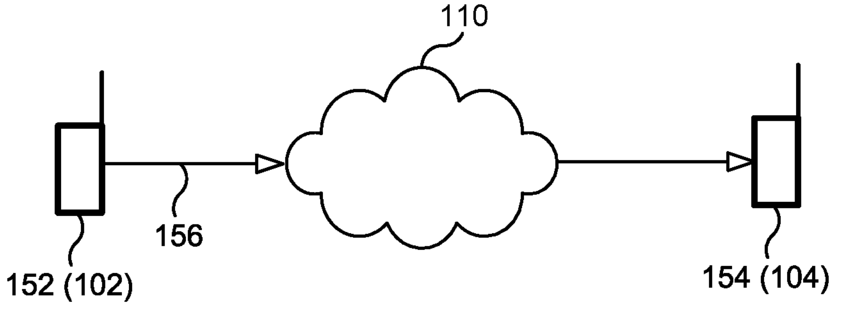
FIG. 1C shows a system according to some embodiments.

In other embodiments, as shown in FIG. 1C, first entity 102 and second entity 104 are first and second UEs 152 and 154. For example, first UE 152 may be an offeror of a video conferencing session or a caller of a video chat, and second UE 154 may be an answerer of the video conference session or the answerer of the video chat. In the embodiments shown in FIG. 1C, first UE 152 is capable of transmitting a video bitstream 156 for a video conference (e.g., Zoom™, Skype™, MS Teams™, etc.) or a video chat (e.g., Facetime™) towards second UE 154. Upon receiving video bitstream 156, second UE 154 may decode received video bitstream 156, thereby generating and displaying a video for the video conferencing session or the video chat.

Figure 2:
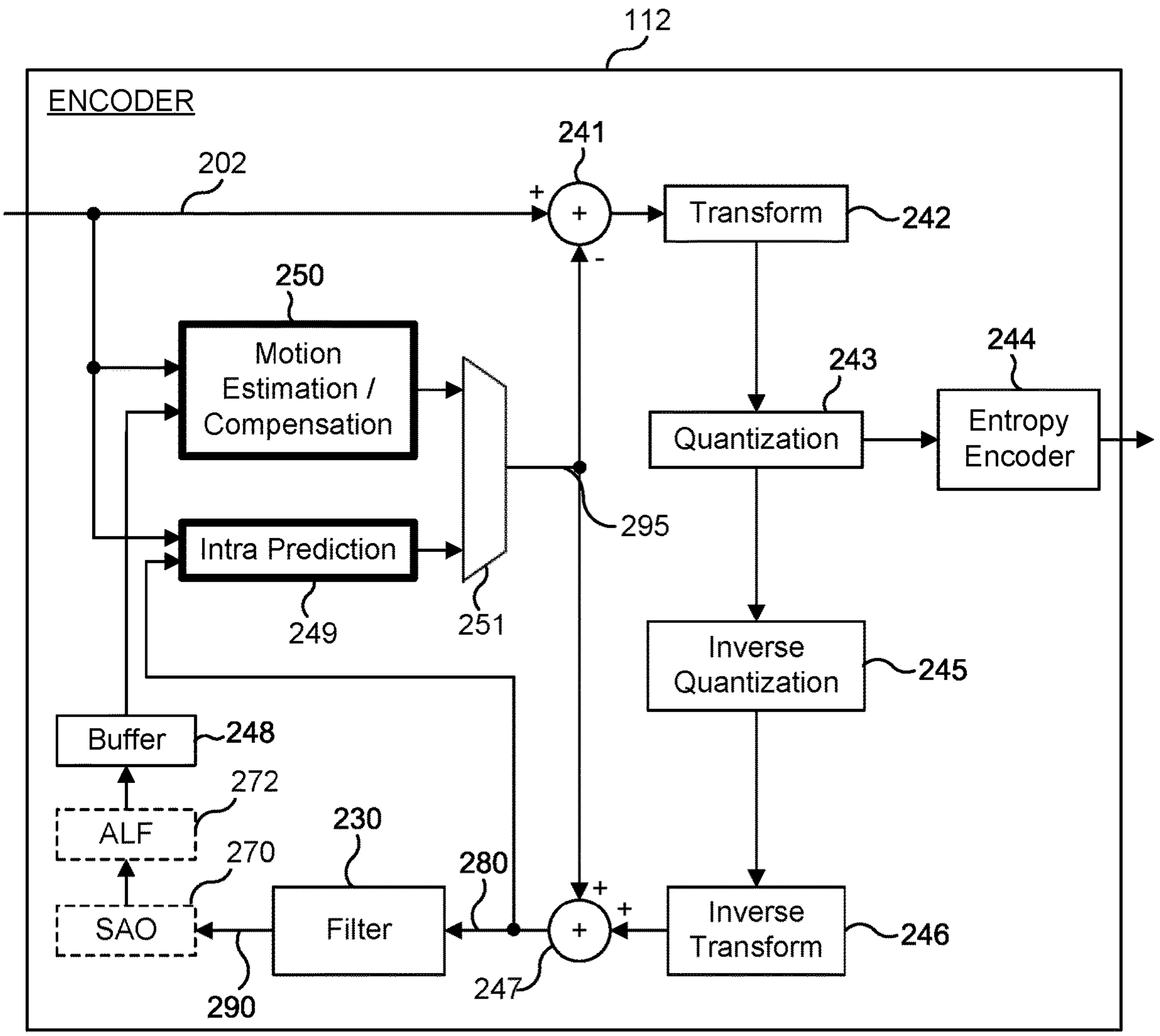
FIG. 2 shows a schematic block diagram of an encoder according to some embodiments.

FIG. 2 shows a schematic block diagram of encoder 112 according to some embodiments. Encoder 112 is configured to encode a block of pixel values (hereafter "block") in a video frame of a source video 202. In encoder 112, a current block (e.g., a block included in a video frame of source video 202) is predicted by performing a motion estimation by a motion estimator 250 from an already provided block in the same frame or in a previous frame. The result of the motion estimation is a motion or displacement vector associated with the reference block, in the case of inter prediction. The motion vector is utilized by motion compensator 250 for outputting an inter prediction of the block.

An intra predictor 249 computes an intra prediction of the current block. The outputs from the motion estimator/compensator 250 and the intra predictor 249 are inputted to a selector 251 that either selects intra prediction or inter prediction for the current block. The output from selector 251 is inputted to an error calculator in the form of an adder 241 that also receives the pixel values of the current block. Adder 241 calculates and outputs a residual error as the difference in pixel values between the block and its prediction. The error is transformed in a transformer 242, such as by a discrete cosine transform, and quantized by a quantizer 243 (thereby, generating values of QP parameters) followed by coding in an encoder 244, such as by entropy encoder. In inter coding, the estimated motion vector is brought to encoder 244 for generating the coded representation of the current block.

The transformed and quantized residual error for the current block is also provided to an inverse quantizer 245 and inverse transformer 246 to retrieve the original residual error. This error is added by an adder 247 to the block prediction output from motion compensator 250 or intra predictor 249 to create a reconstructed sample block 280 that can be used in the prediction and coding of a next block. Reconstructed sample block 280 is processed by a Filter 230 in order to perform filtering to combat any blocking artifact. The output from Filter 230 (e.g., a neural network based filter), i.e., the output data 290, is then temporarily stored in a frame buffer 248, where it is available to intra predictor 249 and motion estimator/compensator 250.

In some embodiments, encoder 112 may also include sample adaptive offset (SAO) unit 270 and/or adaptive loop filter (ALF) 272. SAO unit 270 and ALF 272 may be configured to receive output data 290 from Filter 230, perform additional filtering on output data 290, and provide the filtered output data to buffer 248.

Even though, in the embodiments shown in FIG. 2, Filter 230 is disposed between SAO unit 270 and adder 247, in other embodiments, Filter 230 may replace SAO unit 270 and/or ALF 272. Alternatively, in other embodiments, Filter 230 may be disposed between buffer 248 and motion compensator 250. Furthermore, in some embodiments, a deblocking filter (not shown) may be disposed between Filter 230 and adder 247 such that reconstructed sample block 280 goes through the deblocking process and then is provided to Filter 230. Also, in other embodiments, Filter 230 may serve as a deblocking filter.

Figure 3:
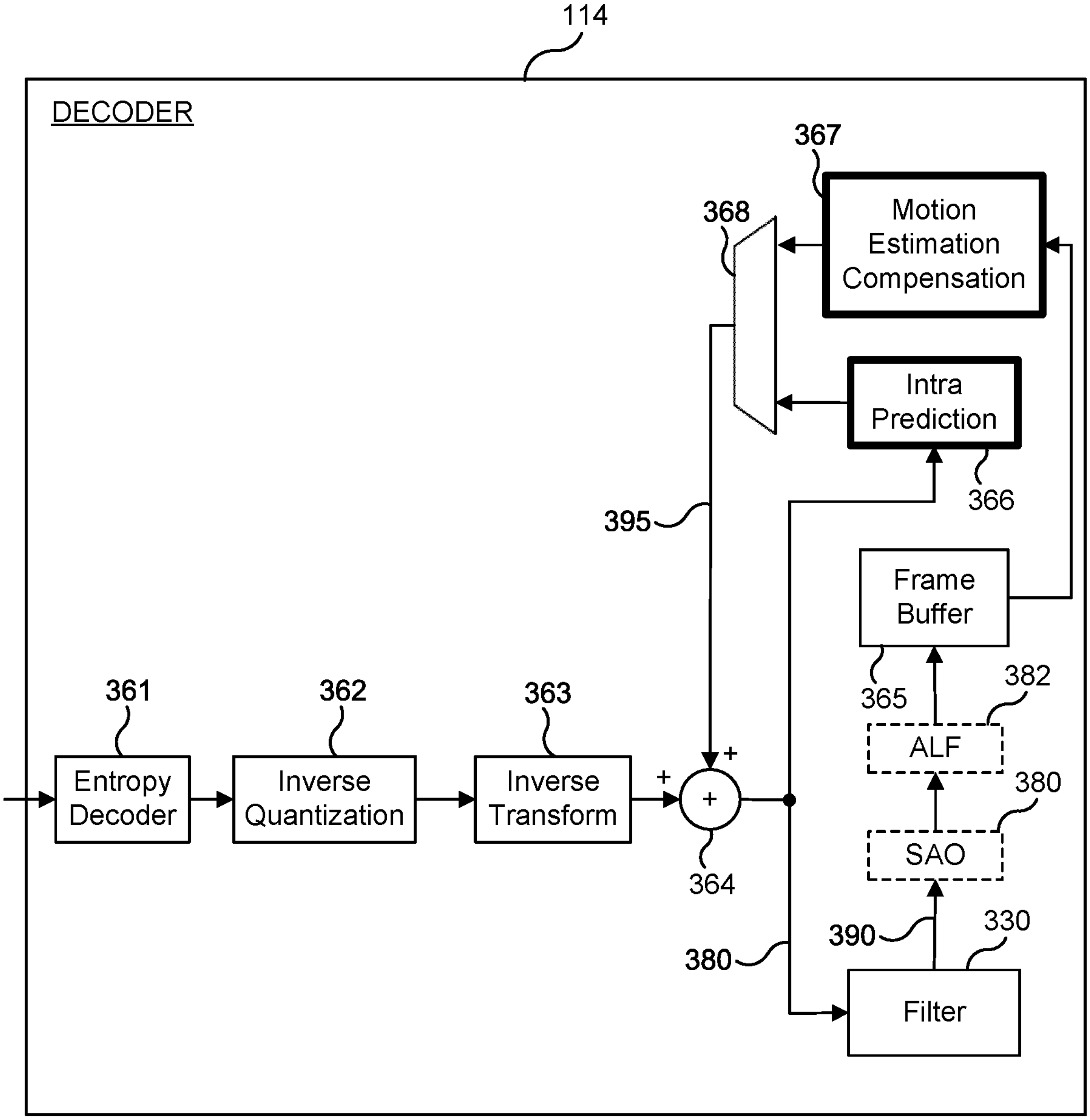
FIG. 3 shows a schematic block diagram of a decoder according to some embodiments.

FIG. 3 is a schematic block diagram of decoder 114 according to some embodiments. Decoder 114 comprises a decoder 361, such as an entropy decoder, for decoding an encoded representation of a block to get a set of quantized and transformed residual errors. These residual errors are dequantized in an inverse quantizer 362 and inverse transformed by an inverse transformer 363 to get a set of residual errors. These residual errors are added in an adder 364 to the pixel values of a reference block. The reference block is determined by a motion estimator/compensator 367 or intra predictor 366, depending on whether inter or intra prediction is performed.

A selector 368 is thereby interconnected to adder 364 and the motion estimator/compensator 367 and intra predictor 366. The resulting decoded block 380 output form adder 364 is input to a Filter unit 330 in order to filter any blocking artifacts. Filtered block 390 is outputted from Filter 330 and is furthermore preferably temporarily provided to a frame buffer 365 and can be used as a reference block for a subsequent block to be decoded.

Frame buffer (e.g., decoded picture buffer (DPB)) 365 is thereby connected to the motion estimator/compensator 367 to make the stored blocks of pixels available to motion estimator/compensator 367. The output from adder 364 is preferably also provided to intra predictor 366 to be used as an unfiltered reference block.

In some embodiments, decoder 114 may include SAO unit 380 and/or ALF 382. SAO unit 380 and ALF 382 may be configured to receive output data 390 from Filter 330, perform additional filtering on output data 390, and provide the filtered output data to buffer 365.

Even though, in the embodiments shown in FIG. 3, Filter 330 is disposed between SAO unit 380 and adder 364, in other embodiments, Filter 330 may replace SAO unit 380 and/or ALF 382. Alternatively, in other embodiments, Filter 330 may be disposed between buffer 365 and motion compensator 367. Furthermore, in some embodiments, a deblocking filter (not shown) may be disposed between Filter 330 and adder 364 such that reconstructed sample block 380 goes through the deblocking process and then is provided to Filter 330.

As discussed above, in encoding a video or decoding a video bitstream, quantization parameters (QP or QPs) may be used (e.g., by quantizer 243 included in encoder 112 and by inverse quantizer 362 included in decoder 114). The values of the QPs may be set differently depending on a resolution of at least a region of picture to which encoding or decoding using the values of the QPs is to be applied. Examples of the at least region of the picture includes a whole picture, a slice, etc. For simple explanation, the embodiments of this disclosure are generally explained with respect to a whole picture. But the embodiments are equally applicable to any region within the picture (meaning that, in the explanation below, the word "picture" can be substitute with "a region of a picture" such as a slice).

In the scenario illustrated in FIG. 1B, if video streaming server 132 wants to transmit to video streaming client 134 a video stream 136 that includes a picture of 4K (3840×2160) resolution, a value of a QP for luma components is set to 36 and a value of a QP for chroma components is set to 36. On the other hand, if video streaming server 132 wants to transmit to video streaming client 134 a video stream 136 that includes a picture of 1920×2160 resolution, a value of a QP for luma components is set to 30 and a value of a QP for chroma components is set to 30. In this disclosure, a QP for luma components is referred as a luma QP and a QP for chroma components is referred as a chroma QP.

Since a desired (configured or ideal) value of luma and chroma QPs may be different depending on a resolution of a picture to which encoding or decoding using the values of the QPs is to be applied, in case the resolution of the picture included in video stream 136 is changed from one resolution (e.g., 4K) to another resolution (e.g., 1920×2160), it is desirable to adjust the value of the luma QP and the value of the chroma QP accordingly.

However, there is a scenario where the value of the chroma QP is not changed correctly even if the resolution of the picture included in video stream 136 is changed from one resolution (e.g., 4K) to another resolution (e.g., 1920×2160). For example, in the existing art, a value of the chroma QP for a current picture resolution is determined based on a value of the luma QP for the current picture resolution, using mapping data (e.g., a mapping table). The table provided below illustrates the concept of the mapping table.

| Corresponding Resolution | Luma QP value | Chroma QP value |
|---|---|---|
| 4K | 36 | 36 |
| 1920 × 2160 | 30 | 32 |

However, as shown above, the mapping table may not output desired value of the chroma QP for a given resolution. For example, even though a desired value of the chroma QP for 1920×2160 resolution is 30, the mapping table may output 32 which is the non-desired value of the chroma QP for the resolution.

Accordingly, in the embodiments of this disclosure, encoder 112 or decoder 114 is configured to generate the desired value of the chroma QP for a given picture resolution. For example, in the scenario above, according to the embodiments of this disclosure, encoder 112 or decoder 114 is configured to generate 30 (not 32) as the value of the chroma QP for 1920×2160 resolution.

Figure 4:
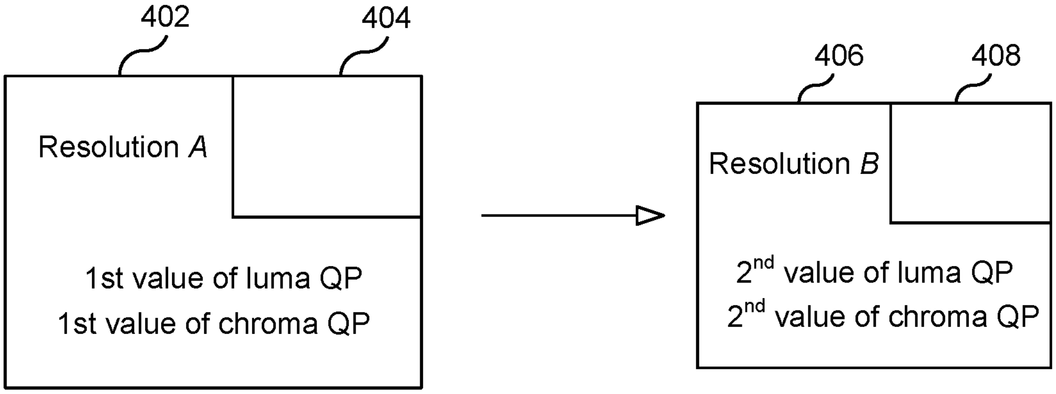
FIG. 4 shows examples of pictures included in a video bitstream.

FIG. 4 shows a first picture 402 having the first resolution A (e.g., 4K—i.e., 3840×2160) and a second picture 406 having the second resolution B (e.g., 1920×2160). First picture 402 may include a region 404 (e.g., a slice) and second picture 406 may include a region 408 (e.g., a slice). Each of first picture 402 and second picture 406 may include different color components. Examples of the color components are Y (luma), Cb (chroma B), and Cr (chroma R).

First picture 402 or region 404 has a desired bitrate given by a first desired value of luma QP or a first desired value of a chroma QP. Similarly, second picture 406 or region 408 has a desired bitrate given by a second desired value of luma QP or a second desired value of a chroma QP. The difference (desiredQPchange) between the first desired value of the luma QP and the second desired value of the luma QP may correspond to a first desired QP difference (a.k.a., a desired QP changing value or a configured QP changing value).

Similarly, the difference between the first desired value of the chroma QP and the second desired value of the chroma QP may correspond to a second desired QP difference. In some embodiments, the first desired QP difference and the second desired QP difference are the same. But in other embodiments, the first desired QP difference and the second desired QP difference are different.

Examples of the desired QP difference (for switching from first resolution A to second resolution B) are −6, −4 and −2 when the second resolution is ½× in both dimensions, ⅔× in both dimensions and ⅘× in both dimensions, as compared to the first resolution. Similarly, the desired QP difference may be 6, 4, and 2 when the second resolution is 2× in both dimensions, 1.5× in both dimensions or 1.25× in both dimensions, as compared to the first resolution. As mentioned above, the above values are provided as examples, and other desired QP differences may be used.

Referring back to FIG. 1B, let's assume that video streaming server 132 transmits towards video streaming client 134 video stream 136 that includes first picture 402 having resolution A (e.g., 4K). Video stream 136 may include the first desired value (e.g., 36) of luma QP for resolution A.

Upon receiving video stream 136, decoder 114 may use a mapping table (e.g., provided below) to find a mapped value (e.g., 36) of chroma QP corresponding to the first desired value (e.g., 36) of luma QP.

| Corresponding Resolution | Luma QP value | Chroma QP value |
|---|---|---|
| 4K | 36 | 36 |
| 1920 × 2160 | 30 | 32 |

Then decoder 114 may use the first desired value of luma QP and the mapped value of chroma QP for decoding first picture 402 or at least region 404 included in first picture 402.

Let's further assume that the operation of video streaming server 132 has changed such that video streaming server 132 now transmits to video streaming client 134 video stream 136 that includes second picture 406 having resolution B (1902×2160). Video stream 136 now includes the second desired value (e.g., 30) of luma QP corresponding to resolution B.

Upon receiving video stream 136, decoder 114 may use the mapping table (e.g., provided below) to find a mapped value (e.g., 32) of chroma QP corresponding to the second desired value (e.g., 30) of luma QP.

| Corresponding Resolution | Luma QP value | Chroma QP value |
|---|---|---|
| 4K | 36 | 36 |
| 1920 × 2160 | 30 | 32 |

However, the obtained mapped value (e.g., 32) of the chroma QP may not be a desired value of the chroma QP for resolution B (e.g., 1920×2160) (Here, the mapped value of chroma QP is also referred as a non-desired value of chroma QP). In other words, the encoding operation performed by encode 112 or the decoding operation performed by decoder 114 using the mapped value of the chroma QP may not be as good as the encoding operation performed by encoder 112 or the decoding operation performed by decoder 114 using the second desired value of the chroma QP.

Accordingly, in some embodiments, encoder 112 or decoder 114 may be configured to generate the second desired value (e.g., 30) of the chroma QP for resolution B even if the mapped value of the chroma QP is not equal to the second desired value.

More specifically, in some embodiments, encoder 112 included in video streaming server 132 may be configured to include within bitstream 136 a chroma QP offset value which may be used for converting the mapped value (e.g., 32) for the chroma QP into the second desired value (e.g., 30) of the chroma QP for resolution B.

There are various ways of calculating the chroma QP offset value to be used in case the resolution of a picture included in bitstream 136 is changed from resolution A (e.g., 4K) to resolution B (1920×2160). In one example, the chroma QP offset value may be calculated as follows: Chroma QP offset value (e.g., −2)=the first desired QP value (e.g., 36) for chroma QP for resolution A−the mapped QP value (e.g., 32) for chroma QP for resolution B+a desired QP changing value ("desiredQPchange") (e.g., −6). In some embodiments, the desired QP changing value may be set to be equal to the desired first QP value (e.g., 36) for luma QP for resolution A−the second desired QP value (e.g., 30) for luma QP for resolution B.

After the chroma QP offset value is calculated, encoder 112 may transmit to decoder 114 the chroma QP offset value. In some embodiments, the chroma QP offset value may be included in bitstream 136. This offset value may be signaled for Cb and Cr or as a slice chroma QP change by enabling slice chroma QP offset flag (pps_slice_chroma_qp_offsets_present_flag set to 1) and then set the chroma QP offsets (sh_cb_qp_offset, sh_cr_qp_offset).

Upon receiving bitstream 136 (that includes the second desired value of luma QP for resolution B, the chroma QP offset value, and/or the desired QP changing value), decoder 114 may calculate the second desired value for chroma QP for resolution B based on the second desired value of luma QP for resolution B and the chroma QP offset value. More specifically, first, decoder 114 may determine a mapped value (e.g., 32) of chroma QP for resolution B (e.g., 1920×2160) based on the second desired value (e.g., 30) of luma QP for resolution B using a mapping table (e.g., provided below).

| Corresponding Resolution | Luma QP value | Chroma QP value |
|---|---|---|
| 4K | 36 | 36 |
| 1920 × 2160 | 30 | 32 |

After determining the mapped value (e.g., 32) of chroma QP for resolution B, decoder 114 may calculate the second desired value (e.g., 30) of chroma QP for resolution B based on the mapped value of chroma QP for resolution B and the chroma QP offset value. For example, the second desired value for chroma QP for resolution B may be calculated as follows: the second desired value (e.g., 30) for chroma QP for resolution B=the mapped value (e.g., 32) for chroma QP for resolution B+the chroma QP offset value (e.g., −2).

After calculating the second desired value of chroma QP for resolution B, decoder 114 may decode second picture 406 or at least region 408 included in second picture 406 using the second desired value (e.g., 30) of chroma QP for resolution B and the second desired value (e.g., 30) of luma QP for resolution B.

An example of the code for the encoder performing Group-Of-Pictures (GOP) based Reference Picture Resampling (RPR) for reduced resolutions 0.5, ⅔, and 4.5 (in both dimensions) is provided below:

```
if (m_gopBasedRPREnabledFlag)
  {
    if (encodingInReducedResolution)
    {
      pps.setSliceChromaQpFlag(true); (enabling pps_slice_chroma_qp_offsets_present_flag)
    }
}
  if(rpcSlice->getPPS( )->getSliceChromaQpFlag( ))
  {
    const bool bUseIntraOrPeriodicOffset = (rpcSlice->isIntra( ) && !rpcSlice->getSPS( )-
>getIBCFlag( )) || (m_pcCfg->getSliceChromaOffsetQpPeriodicity( ) > 0 && (rpcSlice->getPOC( ) %
m_pcCfg->getSliceChromaOffsetQpPeriodicity( )) == 0);
    int                    cbQP   = bUseIntraOrPeriodicOffset ? m_pcCfg-
>getSliceChromaOffsetQpIntraOrPeriodic(false)
                           : m_pcCfg->getGOPEntry(gopld).m_CbQPoffset;
    int                    crQP   = bUseIntraOrPeriodicOffset ? m_pcCfg-
>getSliceChromaOffsetQpIntraOrPeriodic(true)
                           : m_pcCfg->getGOPEntry(gopld).m_CrQPoffset;
#if GOP_BASED_RPR_QP_CHANGE_CHROMA
    // adjust chroma QP offset such that it corresponds to the luma QP change
    if (m_pcCfg->getGOPBasedRPREnabledFlag( ))
    {
      if (rpcSlice->getPPS( )->getPPSId( ) == ENC_PPS_ID_RPR) // 2x (−6)
      {
        int mappedQPbefore = rpcSlice->getSPS( )->getMappedChromaQpValue((ComponentID)1, qp
+ 6);
        int mappedQPafter = rpcSlice->getSPS( )->getMappedChromaQpValue((ComponentID)1, qp);
        int changeIncludingMapping = mappedQPbefore − mappedQPafter; // chroma QP change so
change is same as change for luma (−6)
        cbQP = cbQP + changeIncludingMapping − 6;
        mappedQPbefore = rpcSlice->getSPS( )->getMappedChromaQpValue((ComponentID)2, qp +
6);
        mappedQPafter = rpcSlice->getSPS( )->getMappedChromaQpValue((ComponentID)2, qp);
        changeIncludingMapping = mappedQPbefore − mappedQPafter; // chroma QP change so
change is same as change for luma (−6)
        crQP = crQP + changeIncludingMapping − 6;
      }
      else if (rpcSlice->getPPS( )->getPPSId( ) == ENC_PPS_ID_RPR2) // 1.5x (−4)
      {
        int mappedQPbefore = rpcSlice->getSPS( )->getMappedChromaQpValue((ComponentID)1, qp
+ 4);
```

-continued

```
            int mappedQPafter = rpcSlice->getSPS( )->getMappedChromaQpValue((ComponentID)1, qp);
            int changeIncludingMapping = mappedQPbefore − mappedQPafter; // chroma QP change so
change is same as change for luma (−4)
            cbQP = cbQP + changeIncludingMapping − 4;
            mappedQPbefore = rpcSlice->getSPS( )->getMappedChromaQpValue((ComponentID)2, qp +
4);
            mappedQPafter = rpcSlice->getSPS( )->getMappedChromaQpValue((ComponentID)2, qp);
            changeIncludingMapping = mappedQPbefore − mappedQPafter; // chroma QP change so
change is same as change for luma (−4)
            crQP = crQP + changeIncludingMapping − 4;
          }
          else if (rpcSlice->getPPS( )->getPPSId( ) == ENC_PPS_ID_RPR3) // 1.25x (−2)
          {
            int mappedQPbefore = rpcSlice->getSPS( )->getMappedChromaQpValue((ComponentID)1, qp
+ 2);
            int mappedQPafter = rpcSlice->getSPS( )->getMappedChromaQpValue((ComponentID)1, qp);
            int changeIncludingMapping = mappedQPbefore − mappedQPafter; // chroma QP change so
change is same as change for luma (−2)
            cbQP = cbQP + changeIncludingMapping − 2;
            mappedQPbefore = rpcSlice->getSPS( )->getMappedChromaQpValue((ComponentID)2, qp +
2);
            mappedQPafter = rpcSlice->getSPS( )->getMappedChromaQpValue((ComponentID)2, qp);
            changeIncludingMapping = mappedQPbefore − mappedQPafter; // chroma QP change so
change is same as change for luma (−2)
            crQP = crQP + changeIncludingMapping − 2;
          }
        }
#endif
        int cbCrQP = (cbQP + crQP) >> 1; // use floor of average chroma QP offset for joint-Cb/Cr
coding
        cbQP = Clip3( −12, 12, cbQP + rpcSlice->getPPS( )->getQpOffset(COMPONENT_Cb) ) −
rpcSlice->getPPS( )->getQpOffset(COMPONENT_Cb);
        crQP = Clip3( −12, 12, crQP + rpcSlice->getPPS( )->getQpOffset(COMPONENT_Cr) ) − rpcSlice-
>getPPS( )->getQpOffset(COMPONENT_Cr);
#if GOP_BASED_RPR_QP_CHANGE_CHROMA
        printf("set slice Chroma QP delta Cb=%d\n", cbQP);
#endif
        rpcSlice->setSliceChromaQpDelta(COMPONENT_Cb, Clip3( −12, 12, cbQP));
        CHECK(!(rpcSlice->getSliceChromaQpDelta(COMPONENT_Cb)+rpcSlice->getPPS( )-
>getQpOffset(COMPONENT_Cb)<=12 && rpcSlice-
>getSliceChromaQpDelta(COMPONENT_Cb)+rpcSlice->getPPS( )-
>getQpOffset(COMPONENT_Cb)>=−12), "Unspecified error");
#if GOP_BASED_RPR_QP_CHANGE_CHROMA
        printf("set slice Chroma QP delta Cr=%d\n", crQP);
#endif
        rpcSlice->setSliceChromaQpDelta(COMPONENT_Cr, Clip3( −12, 12, crQP));
        CHECK(!(rpcSlice->getSliceChromaQpDelta(COMPONENT_Cr)+rpcSlice->getPPS( )-
>getQpOffset(COMPONENT_Cr)<=12 && rpcSlice-
>getSliceChromaQpDelta(COMPONENT_Cr)+rpcSlice->getPPS( )-
>getQpOffset(COMPONENT_Cr)>=−12), "Unspecified error");
        if (rpcSlice->getSPS( )->getJointCbCrEnabledFlag( ))
        {
          cbCrQP = Clip3(−12, 12, cbCrQP + rpcSlice->getPPS( )->getQpOffset(JOINT_CbCr)) − rpcSlice-
>getPPS( )->getQpOffset(JOINT_CbCr);
          rpcSlice->setSliceChromaQpDelta(JOINT_CbCr, Clip3( −12, 12, cbCrQP ));
        }
      }
      else
      {
        rpcSlice->setSliceChromaQpDelta( COMPONENT_Cb, 0 );
        rpcSlice->setSliceChromaQpDelta( COMPONENT_Cr, 0 );
        rpcSlice->setSliceChromaQpDelta( JOINT_CbCr, 0 );
      }
```

In the embodiments described above, a common desired QP changing value is used for both luma and chroma components. However, in other embodiments, two different desired QP changing values may be provided for luma components and chroma components (e.g., in case chroma components need to be improved more than the luma components by changing a value of QP more). The table below shows examples of different desired QP changing values for luma and chroma components.

| Resolution Change (in both dimension) | Desired QP changing values for luma components | Desired QP changing value for chroma components |
|---|---|---|
| 1/2 reduction | −6 | −5 |
| 2/3 reduction | −4 | −3 |
| 4/5 reduction | −2 | −1 |

In some embodiments, encoder 112 or decoder 114 may determine how to generate the second desired values of luma QP and chroma QP solely based on a resolution of a picture or a region of a picture included or to be included in bitstream 136. For example, encoder 112 or decoder 114 may detect that the resolution of a picture has changed from resolution A to resolution B, and upon the detection, encoder 112 or decoder 114 may determine a desired QP changing value for luma QP and/or chroma QP. There are different ways for encoder 112 or decoder 114 to determine a desired QP changing value for luma QP and/or chroma QP.

In one example, a mapping table like the one provided above may be stored in encoder 112 or decoder 114, and encoder 112 or decoder 114 may use the mapping table to retrieve desired QP changing value(s) for luma QP and chroma QP based on how much a picture resolution or the resolution of a region is changed, and use the retrieved values to change the values of QPs.

Note that in case the desired QP changing values of the luma QP and the chroma QP are determined solely based on detecting a change in the resolution of a region of a picture, as described above, the desired QP changing values are applied to a value of the luma QP and/or a value of the chroma QP for that region.

More specifically, as mentioned above, even though the embodiments of this disclosure are explained with respect to a whole picture, the embodiments are equally applicable to a part (region) of a picture (e.g., a slice or a block of a picture such as a CU or a CTB). In case the embodiments are applied for a region of a picture, different values of the luma QP may be provided for different regions of the same picture and different values of the chroma QP may be provided for different regions of the same picture. For example, a picture may include a first region having a first size (i.e., a first resolution) and a second region having a second size (i.e., a second resolution). In such case, a first value of the luma QP and a first value of the chroma QP may be provided for the first region and a second value of the luma QP and a second value of the chroma QP may be provided for the second region. In this scenario, the above discussed desired QP changing values derived solely based on the resolution change of respective parts of the whole picture.

In some embodiments, encoding or decoding first picture 402, at least region 404 in first picture 402, second picture 406, or at least region 408 in second picture 406 using a desired value of the luma QP and a desired value of the chroma QP may be performed for Reference Picture Resampling (RPR) or scalable coding.

Figure 5:
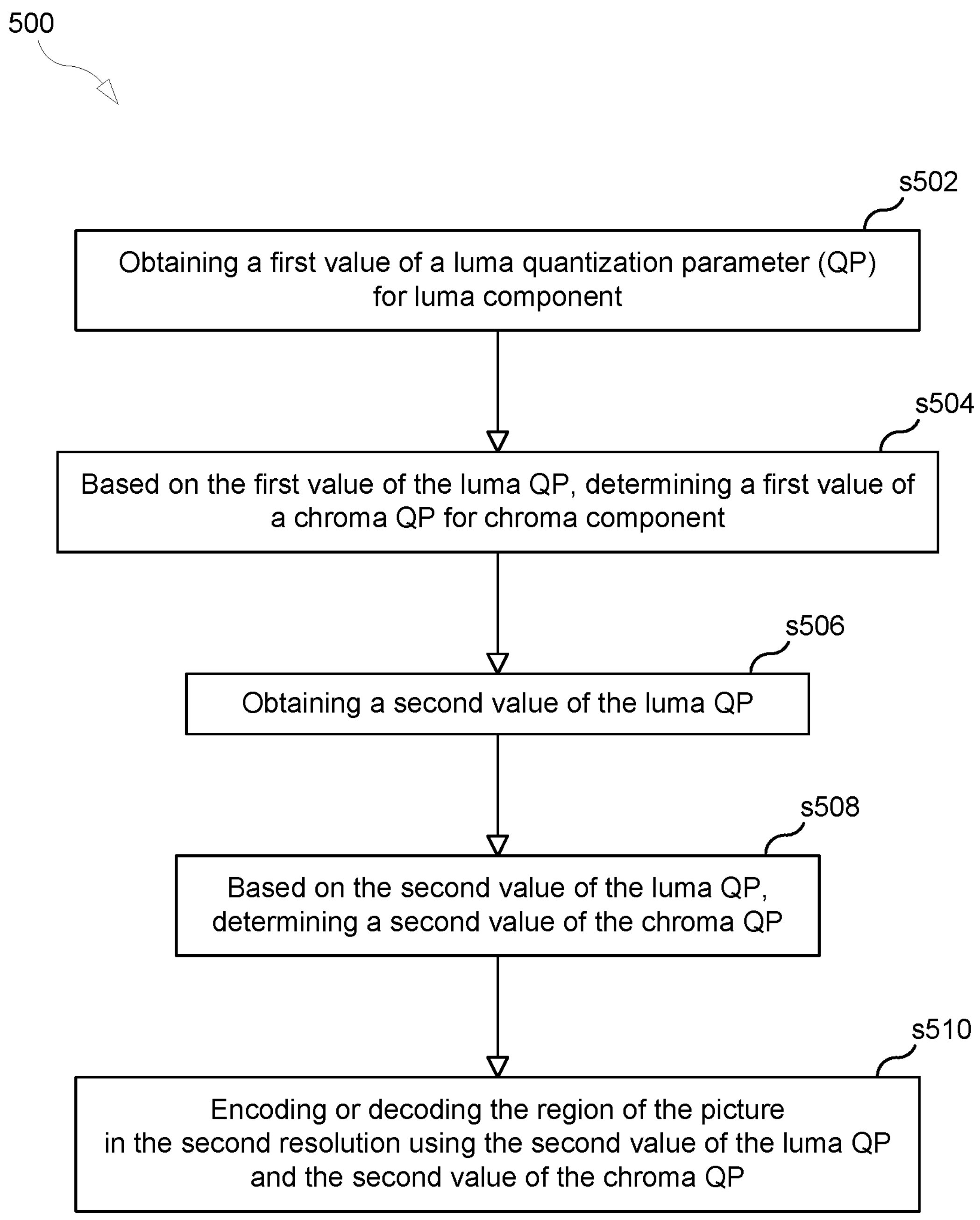
FIG. 5 shows a process according to some embodiments.

FIG. 5 shows a process 500 for encoding or decoding a region of a picture included in a video stream, where the region of the picture can be encoded in any of a first resolution and/or a second resolution. Process 500 may begin with step s502. Step s502 comprises obtaining a first value of a luma quantization parameter, QP, for luma component, wherein the first value of the luma QP is associated with the first resolution. Step s504 comprises, based on the first value of the luma QP, determining a first value of a chroma QP for chroma component, wherein the first value of the chroma QP is associated with the first resolution. Step s506 comprises obtaining a second value of the luma QP, wherein the second value of the luma QP is associated with the second resolution. Step s508 comprises, based on the second value of the luma QP, determining a second value of the chroma QP, wherein the second value of the chroma QP is associated with the second resolution. Step s510 comprises encoding or decoding the region of the picture in the second resolution using the second value of the luma QP and the second value of the chroma QP, wherein a difference between the first value of the luma QP and the second value of the luma QP is same as a difference between the first value of the chroma QP and the second value of the chroma QP.

In some embodiments, the region of the picture is a whole picture or a part of the picture.

In some embodiments, process 500 comprises obtaining a chroma QP offset value for adjusting a value of the chroma QP, wherein the second value of the chroma QP associated with the second resolution is determined based on the chroma QP offset value.

In some embodiments, determining the second value of the chroma QP comprises: based on the second value of the luma QP, using mapping data, retrieving a mapped value of the chroma QP, which is mapped to the second value of the luma QP; and combining the mapped value of the chroma QP and the chroma QP offset value, thereby generating the second value of the chroma QP.

In some embodiments, the second value of the chroma QP=the mapped value of the chroma QP+the chroma QP offset value.

In some embodiments, the chroma QP offset value is included in a picture header or a slice header of the video stream.

In some embodiments, the region of the picture is a first portion of the picture, the chroma QP offset value is for only the first portion of the picture, the picture includes a second portion, and a different QP offset value is provided for the second portion of the picture.

In some embodiments, the chroma QP offset value is set such that the chroma QP offset value=the first value of the chroma QP−the mapped value of the chroma QP+a configured QP changing value, and the configured QP changing value is equal to the difference between the first value of the luma QP and the second value of the luma QP.

In some embodiments, the difference between the first value of the luma QP and the second value of the luma QP is set to be −6, −4, or −2 in case the second resolution is ½, ⅔, or ⅘ of the first resolution, respectively.

In some embodiments, the difference between the first value of the luma QP and the second value of the luma QP is set to be 6, 4, or 2 in case the second resolution is 2, 1.5, or 1.25 times of the first resolution, respectively.

In some embodiments, the picture is at least partly predicted by Reference Picture Resampling, RPR, or is coded with scalable coding.

Figure 6:
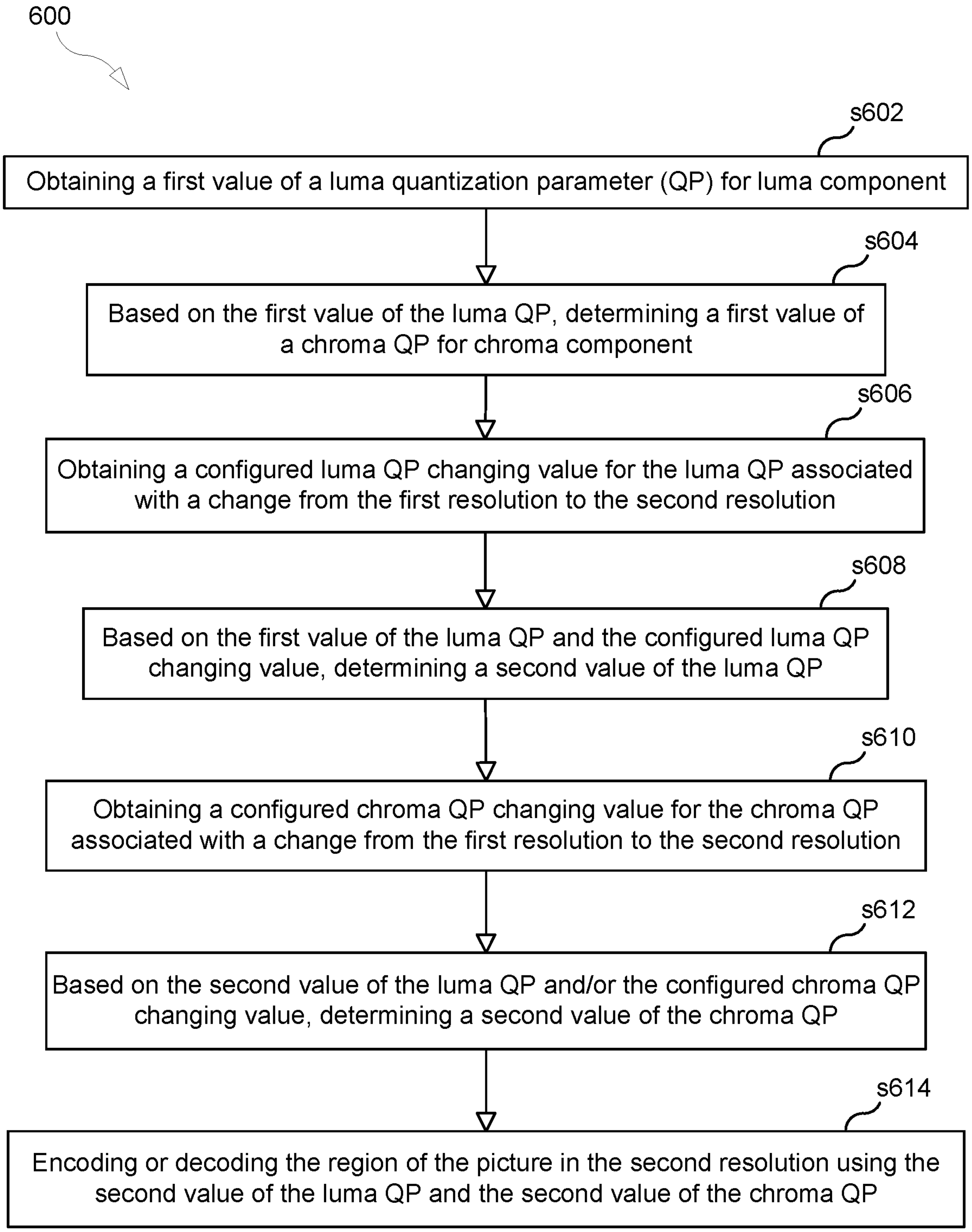
FIG. 6 shows a process according to some embodiments.

FIG. 6 shows a process 600 for encoding or decoding a region of a picture included in a video stream, where the region of the picture can be encoded in any of a first resolution and/or a second resolution. Process 600 may begin with step s602. Step s602 comprises obtaining a first value of a luma quantization parameter, QP, for luma component, wherein the first value of the luma QP is associated with the first resolution. Step s604 comprises, based on the first value of the luma QP, determining a first value of a chroma QP for chroma component, wherein the first value of the chroma QP is associated with the first resolution. Step s606 comprises obtaining a configured luma QP changing value for the luma QP associated with a change from the first resolution to the second resolution. Step s608 comprises, based on the first value of the luma QP and the configured luma QP changing value, determining a second value of the luma QP, wherein the second value of the luma QP is associated with the second resolution. Step s610 comprises obtaining a configured chroma QP changing value for the chroma QP associated with a change from the first resolution to the second resolution, wherein the configured chroma QP changing value is different from the configured luma QP changing value. Step s612 comprises, based on the second value of the luma QP and/or the configured chroma QP changing value, determining a second value of the chroma QP, wherein the second value of the chroma QP is associated with the second resolution. Step s614 comprises encoding or decoding the region of the picture in the second resolution using the second value of the luma QP and the second value of the chroma QP, wherein a difference between the first value of the luma QP and the second value of the luma QP is same as the configured luma QP changing value, and a difference between the first value of the chroma QP and the second value of the chroma QP is same as the configured chroma QP changing value.

In some embodiments, the region of the picture is a whole picture or a part of the picture.

In some embodiments, process 600 comprises obtaining a chroma QP offset value for adjusting a value of the chroma QP, wherein the second value of the chroma QP associated with the second resolution is determined based on the chroma QP offset value.

In some embodiments, determining the second value of the chroma QP comprises: based on the second value of the luma QP, using mapping data, retrieving a mapped value of the chroma QP, which is mapped to the second value of the luma QP; and combining the mapped value of the chroma QP and the chroma QP offset value, thereby generating the second value of the chroma QP.

In some embodiments, the second value of the chroma QP=the mapped value of the chroma QP+the chroma QP offset value.

In some embodiments, the chroma QP offset value is included in a picture header or a slice header of the video stream.

In some embodiments, the region of the picture is a first portion of the picture, the chroma QP offset value is for only the first portion of the picture, the picture includes a second portion, and a different QP offset value is provided for the second portion of the picture.

In some embodiments, the chroma QP offset value is set such that the chroma QP offset value=the first value of the chroma QP−the mapped value of the chroma QP+the configured chroma QP changing value.

In some embodiments, the configured chroma QP changing value −5, −3, or −1 in case the second resolution is $$\frac{1}{2}, \frac{2}{3}, \text{ or } \frac{4}{5}$$

of the first resolution, respectively, and the configured luma QP changing value is −6, −4, or −2 in case the second resolution is $$\frac{1}{2}, \frac{2}{3}, \text{ or } \frac{4}{5}$$

of the first resolution, respectively.

In some embodiments, the configured chroma QP changing value 5, 3, or 1 in case the second resolution is 2, 1.5, or 1.25 times of the first resolution, respectively, and the configured luma QP changing value is 6, 4, or 2 in case the second resolution is 2, 1.5, or 1.25 times of the first resolution, respectively.

In some embodiments, the picture is at least partly predicted by Reference Picture Resampling, RPR, or is coded with scalable coding.

Figure 7:
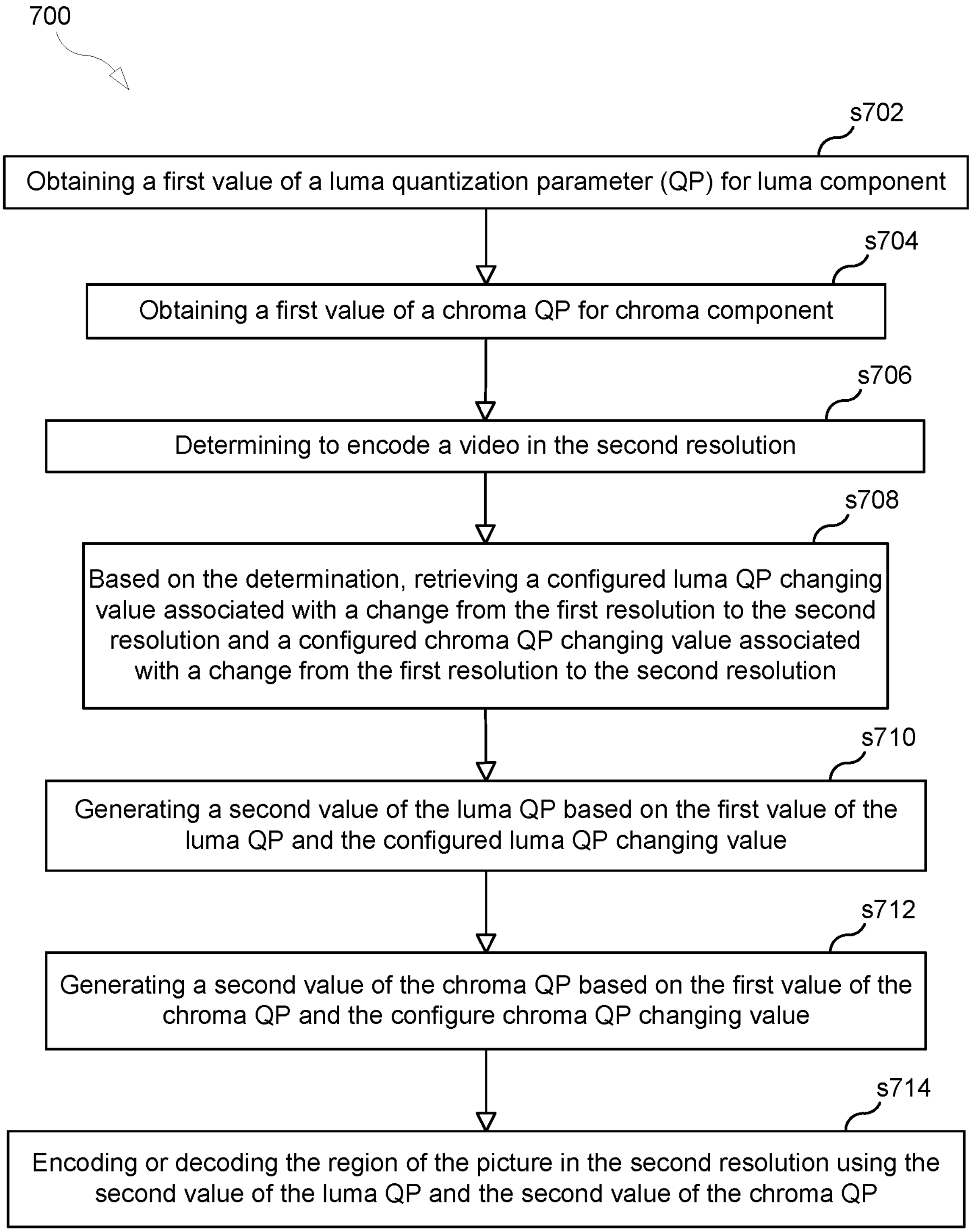
FIG. 7 shows a process according to some embodiments.

FIG. 7 shows a process for encoding or decoding a region of a picture included in a video stream, where the region of the picture can be encoded in any of a first resolution and/or a second resolution. Process 700 may begin with step s702. Step s702 comprises obtaining a first value of a luma quantization parameter, QP, for luma component, wherein the first value of the luma QP is associated with the first resolution. Step s702 comprises obtaining a first value of a chroma QP for chroma component, wherein the first value of the chroma QP is associated with the first resolution. Step s706 comprises determining to encode a video in the second resolution. Step s708 comprises, based on the determination, retrieving a configured luma QP changing value associated with a change from the first resolution to the second resolution and a configured chroma QP changing value associated with a change from the first resolution to the second resolution. Step s710 comprises generating a second value of the luma QP based on the first value of the luma QP and the configured luma QP changing value. Step s712 comprises generating a second value of the chroma QP based on the first value of the chroma QP and the configure chroma QP changing value. Step s714 comprises encoding or decoding the region of the picture in the second resolution using the second value of the luma QP and the second value of the chroma QP.

In some embodiments, the region of the picture is a whole picture or a part of the picture.

In some embodiments, the configured luma QP changing value is same as the configured chroma QP changing value, and the configured luma QP changing value is −6, −4, or −2 in case the second resolution is $$\frac{1}{2}, \frac{2}{3}, \text{ or } \frac{4}{5}$$

of the first resolution, respectively.

In some embodiments, the configured luma QP changing value is same as the configured chroma QP changing value, and the configured luma QP changing value is 6, 4, or 2 in case the second resolution is 2, 1.5, or 1.25 times of the first resolution, respectively.

In some embodiments, the configured chroma QP changing value −5, −3, or −1 in case the second resolution is $$\frac{1}{2}, \frac{2}{3}, \text{ or } \frac{4}{5}$$

of the first resolution, respectively, and the configured luma QP changing value is −6, −4, or −2 in case the second resolution is $$\frac{1}{2}, \frac{2}{3}, \text{ or } \frac{4}{5}$$

of the first resolution, respectively.

In some embodiments, the configured chroma QP changing value 5, 3, or 1 in case the second resolution is 2, 1.5, or 1.25 times of the first resolution, respectively, and the configured luma QP changing value is 6, 4, or 2 in case the second resolution is 2, 1.5, or 1.25 times of the first resolution, respectively.

In some embodiments, the picture is at least partly predicted by Reference Picture Resampling, RPR, or is coded with scalable coding.

Figure 8:
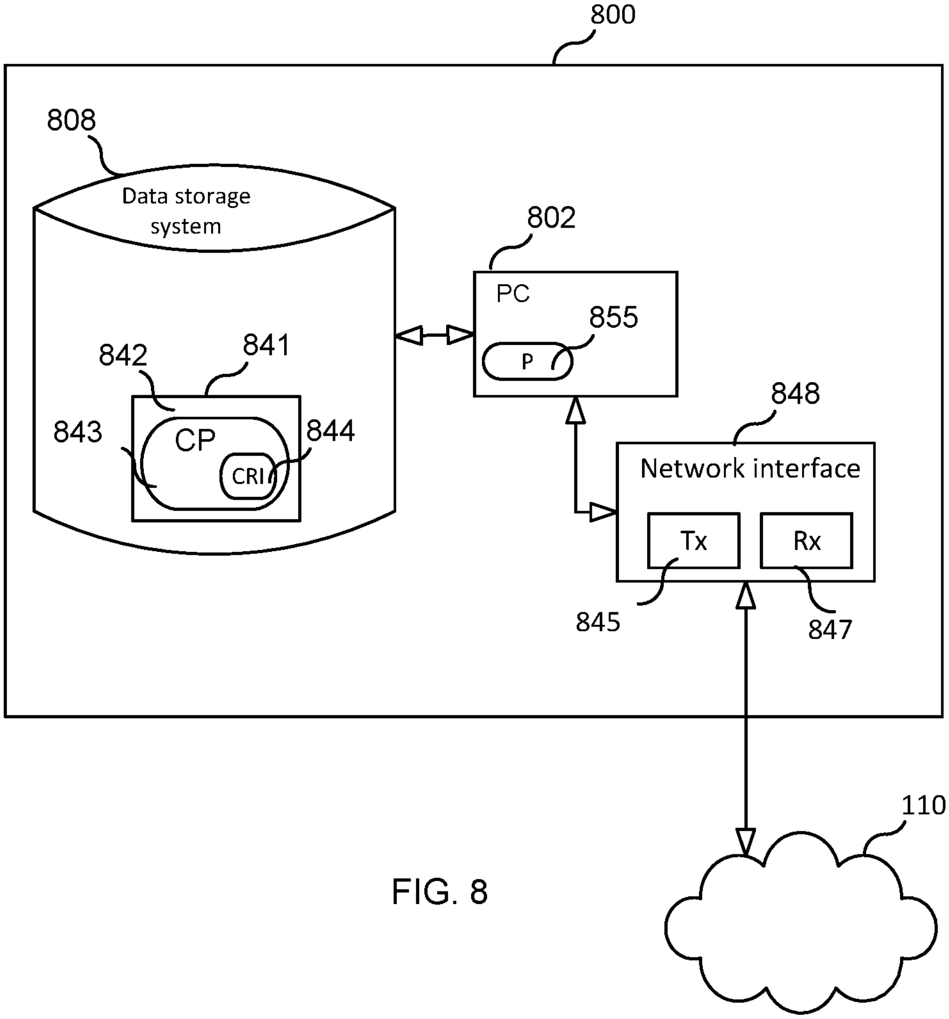
FIG. 8 shows an apparatus according to some embodiments.
Figure 9:
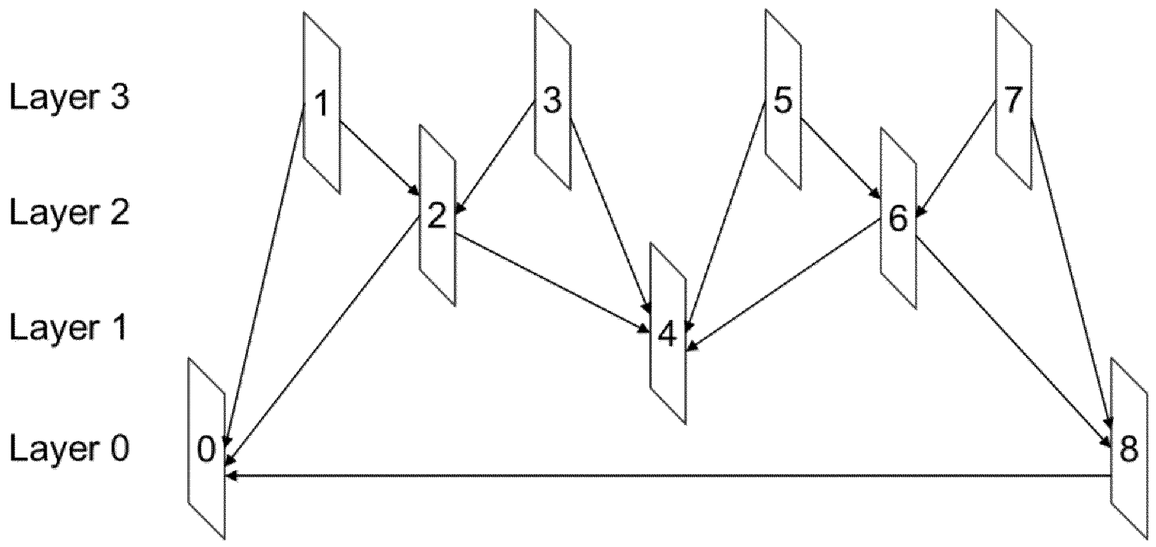
FIG. 9 shows an example of a hierarchy of 8 pictures structure using two reference pictures per picture and an illustration of temporal layers 0 to 3.

FIG. 8 is a block diagram of an apparatus 800 for implementing encoder 112, decoder 114, or a component included in encoder 112 or decoder 114 (e.g., 249, 250 shown in FIG. 2, 366, 367 shown in FIG. 3), according to some embodiments. When apparatus 800 implements a decoder, apparatus 800 may be referred to as a "decoding apparatus 800," and when apparatus 800 implements an encoder, apparatus 800 may be referred to as an "encoding apparatus 800." As shown in FIG. 8, apparatus 800 may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 800 may be a distributed computing apparatus); at least one network interface 848 comprising a transmitter (Tx) 845 and a receiver (Rx) 847 for enabling apparatus 800 to transmit data to and receive data from other nodes connected to a network 110 (e.g., an Internet Protocol (IP) network) to which network interface 848 is connected (directly or indirectly) (e.g., network interface 848 may be wirelessly connected to the network 110, in which case network interface 448 is connected to an antenna arrangement); and a storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes apparatus 800 to perform steps described herein (e.g., steps described herein with reference to the flow charts). In other embodiments, apparatus 800 may be configured to perform steps described herein without the need for code. That is, for example, PC 802 may consist merely of one or more ASICs. Hence, the features of the embodiments described herein may be implemented in hardware and/or software.

SUMMARY OF EMBODIMENTS

A1. A method (500) for encoding or decoding a region of a picture included in a video stream, where the region of the picture can be encoded in any of a first resolution and/or a second resolution, the method comprising:

obtaining (s502) a first value of a luma quantization parameter, QP, for luma component, wherein the first value of the luma QP is associated with the first resolution;

based on the first value of the luma QP, determining (s504) a first value of a chroma QP for chroma component, wherein the first value of the chroma QP is associated with the first resolution;

obtaining (s506) a second value of the luma QP, wherein the second value of the luma QP is associated with the second resolution;

based on the second value of the luma QP, determining (s508) a second value of the chroma QP, wherein the second value of the chroma QP is associated with the second resolution; and encoding or decoding (s510) the region of the picture in the second resolution using the second value of the luma QP and the second value of the chroma QP, wherein a difference between the first value of the luma QP and the second value of the luma QP is same as a difference between the first value of the chroma QP and the second value of the chroma QP.

A1a. The method of embodiment A1, wherein the region of the picture is a whole picture or a part of the picture.

A2. The method of embodiment A1 or A1a, comprising:

obtaining a chroma QP offset value for adjusting a value of the chroma QP, wherein the second value of the chroma QP associated with the second resolution is determined based on the chroma QP offset value.

A3. The method of embodiment A2, wherein determining the second value of the chroma QP comprises:

based on the second value of the luma QP, using mapping data, retrieving a mapped value of the chroma QP, which is mapped to the second value of the luma QP; and combining the mapped value of the chroma QP and the chroma QP offset value, thereby generating the second value of the chroma QP.

A4. The method of embodiment A2 or A3, wherein the second value of the chroma QP=the mapped value of the chroma QP+the chroma QP offset value.

A5. The method of any one of embodiments A2-A4, wherein the chroma QP offset value is included in a picture header or a slice header of the video stream.

A5a. The method of any one of embodiments A2-A5, wherein the region of the picture is a first portion of the picture, the chroma QP offset value is for only the first portion of the picture the picture includes a second portion, and a different QP offset value is provided for the second portion of the picture.

A6. The method of any one of embodiments A2-A5a, wherein the chroma QP offset value is set such that the chroma QP offset value=the first value of the chroma QP−the mapped value of the chroma QP+a configured QP changing value, and the configured QP changing value is equal to the difference between the first value of the luma QP and the second value of the luma QP.

A7. The method of any one of embodiments A1-A6, wherein the difference between the first value of the luma QP and the second value of the luma QP is set to be −6, −4, or −2 in case the second resolution is $$\frac{1}{2}, \frac{2}{3}, \text{ or } \frac{4}{5}$$

of the first resolution, respectively.

A8. The method of any one of embodiments A1-A6, wherein the difference between the first value of the luma QP and the second value of the luma QP is set to be 6, 4, or 2 in case the second resolution is 2, 1.5, or 1.25 times of the first resolution, respectively.

A9. The method of any one of embodiments A1-A8, wherein the picture is at least partly predicted by Reference Picture Resampling, RPR, or is coded with scalable coding.

B1. A method (600) for encoding or decoding a region of a picture included in a video stream, where the region of the picture can be encoded in any of a first resolution and/or a second resolution, the method comprising:

obtaining (s602) a first value of a luma quantization parameter, QP, for luma component, wherein the first value of the luma QP is associated with the first resolution;

based on the first value of the luma QP, determining (s604) a first value of a chroma QP for chroma component, wherein the first value of the chroma QP is associated with the first resolution;

obtaining (s606) a configured luma QP changing value for the luma QP associated with a change from the first resolution to the second resolution;

based on the first value of the luma QP and the configured luma QP changing value, determining (s608) a second value of the luma QP, wherein the second value of the luma QP is associated with the second resolution;

obtaining (s610) a configured chroma QP changing value for the chroma QP associated with a change from the first resolution to the second resolution, wherein the configured chroma QP changing value is different from the configured luma QP changing value;

based on the second value of the luma QP and/or the configured chroma QP changing value, determining (s612) a second value of the chroma QP, wherein the second value of the chroma QP is associated with the second resolution; and encoding or decoding (s614) the region of the picture in the second resolution using the second value of the luma QP and the second value of the chroma QP, wherein a difference between the first value of the luma QP and the second value of the luma QP is same as the configured luma QP changing value, and a difference between the first value of the chroma QP and the second value of the chroma QP is same as the configured chroma QP changing value.

B1a. The method of embodiment B1, wherein the region of the picture is a whole picture or a part of the picture.

B2. The method of embodiment B1 or B1a, comprising:

obtaining a chroma QP offset value for adjusting a value of the chroma QP, wherein the second value of the chroma QP associated with the second resolution is determined based on the chroma QP offset value.

B3. The method of embodiment B2, wherein determining the second value of the chroma QP comprises:

based on the second value of the luma QP, using mapping data, retrieving a mapped value of the chroma QP, which is mapped to the second value of the luma QP; and combining the mapped value of the chroma QP and the chroma QP offset value, thereby generating the second value of the chroma QP.

B4. The method of embodiment B2 or B3, wherein the second value of the chroma QP=the mapped value of the chroma QP+the chroma QP offset value.

B5. The method of any one of embodiments B2-B4, wherein the chroma QP offset value is included in a picture header or a slice header of the video stream.

B5a. The method of any one of embodiments B2-B5, wherein the region of the picture is a first portion of the picture, the chroma QP offset value is for only the first portion of the picture the picture includes a second portion, and a different QP offset value is provided for the second portion of the picture.

B6. The method of any one of embodiments B2-B5a, wherein the chroma QP offset value is set such that the chroma QP offset value=the first value of the chroma QP−the mapped value of the chroma QP+the configured chroma QP changing value.

B7. The method of any one of embodiments B1-B7, wherein the configured chroma QP changing value −5, −3, or −1 in case the second resolution is $$\frac{1}{2}, \frac{2}{3}, \text{ or } \frac{4}{5}$$

of the first resolution, respectively, and the configured luma QP changing value is −6, −4, or −2 in case the second resolution is $$\frac{1}{2}, \frac{2}{3}, \text{ or } \frac{4}{5}$$

of the first resolution, respectively.

B8. The method of any one of embodiments B1-B6, wherein the configured chroma QP changing value 5, 3, or 1 in case the second resolution is 2, 1.5, or 1.25 times of the first resolution, respectively, and the configured luma QP changing value is 6, 4, or 2 in case the second resolution is 2, 1.5, or 1.25 times of the first resolution, respectively.

B9. The method of any one of embodiments B1-B8, wherein the picture is at least partly predicted by Reference Picture Resampling, RPR, or is coded with scalable coding.

C1. A method (700) for encoding or decoding a region of a picture included in a video stream, where the region of the picture can be encoded in any of a first resolution and/or a second resolution, the method comprising:

obtaining (s702) a first value of a luma quantization parameter, QP, for luma component, wherein the first value of the luma QP is associated with the first resolution;

obtaining (s704) a first value of a chroma QP for chroma component, wherein the first value of the chroma QP is associated with the first resolution;

determining (s706) to encode a video in the second resolution;

based on the determination, retrieving (s708) a configured luma QP changing value associated with a change from the first resolution to the second resolution and a configured chroma QP changing value associated with a change from the first resolution to the second resolution;

generating (s710) a second value of the luma QP based on the first value of the luma QP and the configured luma QP changing value;

generating (s712) a second value of the chroma QP based on the first value of the chroma QP and the configure chroma QP changing value; and encoding or decoding (s714) the region of the picture in the second resolution using the second value of the luma QP and the second value of the chroma QP.

C1a. The method of embodiment C1, wherein the region of the picture is a whole picture or a part of the picture.

C2. The method of embodiment C1 or C1a, wherein the configured luma QP changing value is same as the configured chroma QP changing value, and the configured luma QP changing value is −6, −4, or −2 in case the second resolution is $$\frac{1}{2}, \frac{2}{3}, \text{ or } \frac{4}{5}$$

of the first resolution, respectively.

C3. The method of embodiment C1 or C1a, wherein the configured luma QP changing value is same as the configured chroma QP changing value, and the configured luma QP changing value is 6, 4, or 2 in case the second resolution is 2, 1.5, or 1.25 times of the first resolution, respectively.

C4. The method of embodiment C1 or C1a, wherein the configured chroma QP changing value −5, −3, or −1 in case the second resolution is $$\frac{1}{2}, \frac{2}{3}, \text{ or } \frac{4}{5}$$

of the first resolution, respectively, and the configured luma QP changing value is −6, −4, or −2 in case the second resolution is $$\frac{1}{2}, \frac{2}{3}, \text{ or } \frac{4}{5}$$

of the first resolution, respectively.

C5. The method of embodiment C1 or C1a, wherein the configured chroma QP changing value 5, 3, or 1 in case the second resolution is 2, 1.5, or 1.25 times of the first resolution, respectively, and the configured luma QP changing value is 6, 4, or 2 in case the second resolution is 2, 1.5, or 1.25 times of the first resolution, respectively.

C6. The method of any one of embodiments C1-C5, wherein the picture is at least partly predicted by Reference Picture Resampling, RPR, or is coded with scalable coding.

D1. A computer program (800) comprising instructions (844) which when executed by processing circuitry (802) cause the processing circuitry to perform the method of any one of embodiments A1-C6.

D2. A carrier containing the computer program of embodiment D1, wherein the carrier is one of an electronic signal, an optical signal, a radio signal, and a computer readable storage medium.

E1. An apparatus (800) for encoding or decoding a region of a picture included in a video stream, where the region of the picture can be encoded in any of a first resolution and/or a second resolution, the apparatus being configured to:

obtain (s502) a first value of a luma quantization parameter, QP, for luma component, wherein the first value of the luma QP is associated with the first resolution;

based on the first value of the luma QP, determine (s504) a first value of a chroma QP for chroma component, wherein the first value of the chroma QP is associated with the first resolution;

obtain (s506) a second value of the luma QP, wherein the second value of the luma QP is associated with the second resolution;

based on the second value of the luma QP, determine (s508) a second value of the chroma QP, wherein the second value of the chroma QP is associated with the second resolution; and encode or decode (s510) the region of the picture in the second resolution using the second value of the luma QP and the second value of the chroma QP, wherein a difference between the first value of the luma QP and the second value of the luma QP is same as a difference between the first value of the chroma QP and the second value of the chroma QP.

E2. The apparatus of embodiment E1, wherein the apparatus is further configured to perform the method of any one of embodiments A2-A9.

F1. An apparatus (800) for encoding or decoding a region of a picture included in a video stream, where the region of the picture can be encoded in any of a first resolution and/or a second resolution, the apparatus being configured to:

obtain (s602) a first value of a luma quantization parameter, QP, for luma component, wherein the first value of the luma QP is associated with the first resolution;

based on the first value of the luma QP, determine (s604) a first value of a chroma QP for chroma component, wherein the first value of the chroma QP is associated with the first resolution;

obtain (s606) a configured luma QP changing value for the luma QP associated with a change from the first resolution to the second resolution;

based on the first value of the luma QP and the configured luma QP changing value, determine (s608) a second value of the luma QP, wherein the second value of the luma QP is associated with the second resolution;

obtain (s610) a configured chroma QP changing value for the chroma QP associated with a change from the first resolution to the second resolution, wherein the configured chroma QP changing value is different from the configured luma QP changing value;

based on the second value of the luma QP and/or the configured chroma QP changing value, determine (s612) a second value of the chroma QP, wherein the second value of the chroma QP is associated with the second resolution; and encode or decode (s614) the region of the picture in the second resolution using the second value of the luma QP and the second value of the chroma QP, wherein a difference between the first value of the luma QP and the second value of the luma QP is same as the configured luma QP changing value, and a difference between the first value of the chroma QP and the second value of the chroma QP is same as the configured chroma QP changing value.

F2. The apparatus of embodiment F1, wherein the apparatus is further configured to perform the method of any one of embodiments B2-B9.

G1. An apparatus (800) for encoding or decoding a region of a picture included in a video stream, where the region of the picture can be encoded in any of a first resolution and/or a second resolution, the apparatus being configured to:

obtain (s702) a first value of a luma quantization parameter, QP, for luma component, wherein the first value of the luma QP is associated with the first resolution;

obtain (s704) a first value of a chroma QP for chroma component, wherein the first value of the chroma QP is associated with the first resolution;

determine (s706) to encode a video in the second resolution;

based on the determination, retrieve (s708) a configured luma QP changing value associated with a change from the first resolution to the second resolution and a configured chroma QP changing value associated with a change from the first resolution to the second resolution;

generate (s710) a second value of the luma QP based on the first value of the luma QP and the configured luma QP changing value;

generate (s712) a second value of the chroma QP based on the first value of the chroma QP and the configure chroma QP changing value; and encode or decode (s714) the region of the picture in the second resolution using the second value of the luma QP and the second value of the chroma QP.

G2. The apparatus of embodiment G1, wherein the apparatus is further configured to perform the method of any one of embodiments C2-C6.

H1. An apparatus (800) comprising:

a processing circuitry (802); and a memory (841), said memory containing instructions executable by said processing circuitry, whereby the apparatus is operative to perform the method of any one of embodiments A1-C6.

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for encoding or decoding a region of a picture included in a video stream, where the region of the picture can be encoded in any of a first resolution and/or a second resolution, the method comprising:

obtaining a first value of a luma quantization parameter (QP) for luma component, wherein the first value of the luma QP is associated with the first resolution;

based on the first value of the luma QP, determining a first value of a chroma QP for chroma component, wherein the first value of the chroma QP is associated with the first resolution;

obtaining a second value of the luma QP, wherein the second value of the luma QP is associated with the second resolution;

based on the second value of the luma QP, determining a second value of the chroma QP, wherein the second value of the chroma QP is associated with the second resolution; and encoding or decoding the region of the picture in the second resolution using the second value of the luma QP and the second value of the chroma QP, wherein a difference between the first value of the luma QP and the second value of the luma QP is same as a difference between the first value of the chroma QP and the second value of the chroma QP.

2. The method of claim 1, wherein the region of the picture is a whole picture, or the region of the picture is a part of the picture.

3. The method of claim 1, wherein the method further comprises:

obtaining a chroma QP offset value for adjusting a value of the chroma QP, wherein the second value of the chroma QP associated with the second resolution is determined based on the chroma QP offset value.

4. The method of claim 3, wherein determining the second value of the chroma QP comprises:

based on the second value of the luma QP, using mapping data, retrieving a mapped value of the chroma QP, which is mapped to the second value of the luma QP; and generating the second value of the chroma QP by combining the mapped value of the chroma QP and the chroma QP offset value.

5. The method of claim 4, wherein the second value of the chroma QP the equals the mapped value of the chroma QP the plus the chroma QP offset value.

6. The method of claim 3, wherein the chroma QP offset value is included in a picture header or a slice header of the video stream.

7. The method of claim 3, wherein the region of the picture is a first portion of the picture, the chroma QP offset value is for only the first portion of the picture, the picture includes a second portion, and a different QP offset value is provided for the second portion of the picture.

8. The method of claim 4, wherein the chroma QP offset value is set such that the chroma QP offset value the equals the first value of the chroma QP minus the mapped value of the chroma QP plus+a configured QP changing value, and the configured QP changing value is equal to the difference between the first value of the luma QP and the second value of the luma QP.

9. The method of claim 1, wherein the difference between the first value of the luma QP and the second value of the luma QP is set to be −6, −4, or −2 in case the second resolution is $$\frac{1}{2}, \frac{2}{3}, \text{ or } \frac{4}{5}$$

of the first resolution, respectively.

10. The method of claim 1, wherein the difference between the first value of the luma QP and the second value of the luma QP is set to be 6, 4, or 2 in case the second resolution is 2, 1.5, or 1.25 times of the first resolution, respectively.

11. The method of claim 1, wherein the picture is at least partly predicted by Reference Picture Resampling, RPR, or is coded with scalable coding.

12. A method for encoding or decoding a region of a picture included in a video stream, where the region of the picture can be encoded in any of a first resolution and/or a second resolution, the method comprising:

obtaining a first value of a luma quantization parameter (QP) for luma component, wherein the first value of the luma QP is associated with the first resolution;

obtaining a first value of a chroma QP for chroma component, wherein the first value of the chroma QP is associated with the first resolution;

determining to encode a video in the second resolution;

based on the determination, retrieving a configured luma QP changing value associated with a change from the first resolution to the second resolution and a configured chroma QP changing value associated with a change from the first resolution to the second resolution;

generating a second value of the luma QP based on the first value of the luma QP and the configured luma QP changing value;

generating a second value of the chroma QP based on the first value of the chroma QP and the configured chroma QP changing value; and encoding or decoding the region of the picture in the second resolution using the second value of the luma QP and the second value of the chroma QP.

13. The method of claim 12, wherein the region of the picture is a whole picture, or the region of the picture is a part of the picture.

14. The method of claim 12, wherein the configured luma QP changing value is same as the configured chroma QP changing value, and the configured luma QP changing value is −6, −4, or −2 in case the second resolution is $$\frac{1}{2}, \frac{2}{3}, \text{ or } \frac{4}{5}$$

of the first resolution, respectively.

15. The method of claim 12, wherein the configured luma QP changing value is same as the configured chroma QP changing value, and the configured luma QP changing value is 6, 4, or 2 in case the second resolution is 2, 1.5, or 1.25 times of the first resolution, respectively.

16. The method of claim 12, wherein the configured chroma QP changing value is −5, −3, or −1 in case the second resolution is $$\frac{1}{2}, \frac{2}{3}, \text{ or } \frac{4}{5}$$

of the first resolution, respectively, and the configured luma QP changing value is −6, −4, or −2 in case the second resolution is $$\frac{1}{2}, \frac{2}{3}, \text{ or } \frac{4}{5}$$

of the first resolution, respectively.

17. The method of claim 12, wherein the configured chroma QP changing value is 5, 3, or 1 in case the second resolution is 2, 1.5, or 1.25 times of the first resolution, respectively, and the configured luma QP changing value is 6, 4, or 2 in case the second resolution is 2, 1.5, or 1.25 times of the first resolution, respectively.

18. The method of claim 12, wherein the picture is at least partly predicted by Reference Picture Resampling, or is coded with scalable coding.

19. A non-transitory computer readable storage medium storing a computer program comprising instructions for configuring an apparatus comprising processing circuitry capable of executing the computer program to perform the method of claim 1.

20. A non-transitory computer readable storage medium storing a computer program comprising instructions for configuring an apparatus comprising processing circuitry capable of executing the computer program to perform the method of claim 12.

21. An apparatus for encoding or decoding a region of a picture included in a video stream, where the region of the picture can be encoded in any of a first resolution and/or a second resolution, the apparatus comprising:

a processing circuitry; and a memory storing instructions executable by the processing circuitry, wherein the apparatus is operative to perform a method comprising:

obtaining a first value of a luma quantization parameter (QP) for luma component, wherein the first value of the luma QP is associated with the first resolution;

based on the first value of the luma QP, determining a first value of a chroma QP for chroma component, wherein the first value of the chroma QP is associated with the first resolution;

obtaining a second value of the luma QP, wherein the second value of the luma QP is associated with the second resolution;

based on the second value of the luma QP, determining a second value of the chroma QP, wherein the second value of the chroma QP is associated with the second resolution; and encoding or decoding the region of the picture in the second resolution using the second value of the luma QP and the second value of the chroma QP, wherein a difference between the first value of the luma QP and the second value of the luma QP is same as a difference between the first value of the chroma QP and the second value of the chroma QP.

22. The apparatus of claim 21, wherein the method further comprises obtaining a chroma QP offset value for adjusting a value of the chroma QP, and the second value of the chroma QP associated with the second resolution is determined based on the chroma QP offset value.

23. An apparatus for encoding or decoding a region of a picture included in a video stream, where the region of the picture can be encoded in any of a first resolution and/or a second resolution, the apparatus comprising:

a processing circuitry; and a memory storing instructions executable by the processing circuitry, wherein the apparatus is operative to perform a method comprising:

obtaining a first value of a luma quantization parameter (QP) for luma component, wherein the first value of the luma QP is associated with the first resolution;

obtaining a first value of a chroma QP for chroma component, wherein the first value of the chroma QP is associated with the first resolution;

determining to encode a video in the second resolution;

based on the determination, retrieving a configured luma QP changing value associated with a change from the first resolution to the second resolution and a configured chroma QP changing value associated with a change from the first resolution to the second resolution;

generating a second value of the luma QP based on the first value of the luma QP and the configured luma QP changing value;

generating a second value of the chroma QP based on the first value of the chroma QP and the configured chroma QP changing value; and encoding or decoding the region of the picture in the second resolution using the second value of the luma QP and the second value of the chroma QP.

24. The apparatus of claim 23, wherein the configured luma QP changing value is same as the configured chroma QP changing value, and the configured luma QP changing value is −6, −4, or −2 in case the second resolution is ½, ⅔, or ⅘ of the first resolution, respectively.

* * * * *